(12) United States Patent  
Geelen

(10) Patent No.: US 7,925,429 B2  
(45) Date of Patent: Apr. 12, 2011

(54) PERSONAL GPS NAVIGATION DEVICE

(75) Inventor: Pieter Geelen, Hilversum (NL)

(73) Assignee: TomTom International B.V., Amsterdam (NL)

( * ) Notice: Subject to any disclaimer, the term of this patent is extended or adjusted under 35 U.S.C. 154(b) by 57 days.

(21) Appl. No.: 12/292,128

(22) Filed: Nov. 12, 2008

(65) Prior Publication Data

US 2009/0150064 A1 Jun. 11, 2009

Related U.S. Application Data

(63) Continuation of application No. 11/428,832, filed on Jul. 5, 2006, which is a continuation of application No. 10/452,492, filed on Jun. 2, 2003, now abandoned.

(51) Int. Cl.  
*G01C 21/36* (2006.01)

(52) U.S. Cl. ........ 701/201; 701/213; 701/216; 701/200; 701/117; 345/418; 345/419

(58) Field of Classification Search .................. 701/213, 701/216, 301, 117, 200, 201, 212; 345/419, 345/418  
See application file for complete search history.

(56) References Cited

U.S. PATENT DOCUMENTS

| | | | |
|---|---|---|---|
| 4,837,700 A | 6/1989 | Ando et al. | |
| 5,225,842 A | 7/1993 | Brown et al. | |
| 5,383,127 A * | 1/1995 | Shibata | 701/216 |
| 5,787,383 A * | 7/1998 | Moroto et al. | 701/210 |
| 5,848,373 A | 12/1998 | DeLorme et al. | |
| 5,917,436 A * | 6/1999 | Endo et al. | 340/995.14 |
| 5,951,620 A | 9/1999 | Ahrens et al. | |
| 6,038,522 A | 3/2000 | Manson et al. | |
| 6,041,280 A * | 3/2000 | Kohli et al. | 701/201 |
| 6,141,014 A * | 10/2000 | Endo et al. | 345/427 |
| 6,157,342 A * | 12/2000 | Okude et al. | 342/357.3 |
| 6,169,552 B1 * | 1/2001 | Endo et al. | 345/427 |
| 6,266,615 B1 | 7/2001 | Jin | |
| 6,278,383 B1 * | 8/2001 | Endo et al. | 340/995.14 |
| 6,317,689 B1 * | 11/2001 | Lee | 701/213 |
| 6,321,158 B1 | 11/2001 | DeLorme et al. | |
| 6,336,073 B1 | 1/2002 | Ihara et al. | |
| 6,346,942 B1 * | 2/2002 | Endo et al. | 345/427 |
| 6,347,280 B1 | 2/2002 | Inoue et al. | |
| 6,401,035 B2 | 6/2002 | Jin | |
| 6,434,484 B1 | 8/2002 | Lee | |
| 6,480,557 B1 | 11/2002 | Rog et al. | |
| 6,484,094 B1 | 11/2002 | Wako | |
| 6,496,695 B1 | 12/2002 | Kouji et al. | |

(Continued)

OTHER PUBLICATIONS

United States Office Action dated Nov. 12, 2009.

(Continued)

*Primary Examiner* — Thomas G Black  
*Assistant Examiner* — Wae Louie  
(74) *Attorney, Agent, or Firm* — Harness, Dickey & Pierce

(57) ABSTRACT

A navigation device is disclosed. In at least one embodiment, the navigation device includes a storage device to store map information;  
a processor to determine a route of travel based upon a current position of the navigation device and an input or selected destination position; and  
a display to display the current position on the map information corresponding to the determined route of travel, the display including relatively more detail of the map information being displayed upon the processor determining that a speed of a vehicle, in which the navigation device is located, is below a threshold speed.

8 Claims, 18 Drawing Sheets

U.S. PATENT DOCUMENTS

| | | | |
|---|---|---|---|
| 6,526,351 | B2 | 2/2003 | Whitham |
| 6,574,554 | B1 | 6/2003 | Beesley et al. |
| 6,587,782 | B1 | 7/2003 | Nocek et al. |
| 6,603,407 | B2 * | 8/2003 | Endo et al. ............... 340/995.14 |
| 6,629,035 | B2 | 9/2003 | Seto et al. |
| 6,654,014 | B2 * | 11/2003 | Endo et al. .................... 345/427 |
| 6,687,605 | B1 | 2/2004 | Wako |
| 6,707,421 | B1 | 3/2004 | Drury et al. |
| 6,711,475 | B2 | 3/2004 | Murphy |
| 6,747,680 | B1 | 6/2004 | Igarashi et al. |
| 6,756,919 | B2 * | 6/2004 | Endo et al. ............... 340/995.14 |
| 6,760,027 | B2 * | 7/2004 | Endo et al. .................... 345/427 |
| 6,853,912 | B2 | 2/2005 | Han |
| 6,898,516 | B2 | 5/2005 | Pechatnikov et al. |
| 6,904,360 | B2 | 6/2005 | Pechatnikov et al. |
| 6,917,878 | B2 | 7/2005 | Pechatnikov et al. |
| 6,947,064 | B1 * | 9/2005 | Hahn et al. .................... 701/301 |
| 7,089,110 | B2 | 8/2006 | Pechatnikov et al. |
| 7,089,115 | B2 | 8/2006 | Chapman et al. |
| 7,102,565 | B2 | 9/2006 | Jesson |
| 7,127,723 | B2 * | 10/2006 | Endo et al. .................... 719/319 |
| 7,151,997 | B2 | 12/2006 | Uhlmann et al. |
| 7,171,304 | B2 | 1/2007 | Wako |
| 7,206,692 | B2 | 4/2007 | Beesley et al. |
| 7,212,920 | B1 | 5/2007 | Bailey et al. |
| 7,283,905 | B1 | 10/2007 | Beesley et al. |
| 7,519,469 | B2 | 4/2009 | de Silva et al. |
| 7,538,795 | B2 | 5/2009 | Shibatani et al. |
| 7,555,388 | B2 | 6/2009 | Han |
| 7,668,649 | B2 | 2/2010 | Onishi |
| 2002/0082122 | A1 | 6/2002 | Pippin et al. |
| 2002/0188776 | A1 | 12/2002 | Houlberg |
| 2004/0030493 | A1 | 2/2004 | Pechatnikov et al. |
| 2004/0243307 | A1 | 12/2004 | Geelen |
| 2005/0200520 | A1 | 9/2005 | Jesson |
| 2006/0161379 | A1 | 7/2006 | Ellenby et al. |
| 2007/0027628 | A1 | 2/2007 | Geelen |
| 2007/0124070 | A1 | 5/2007 | Kawai et al. |
| 2009/0138194 | A1 | 5/2009 | Geelen |
| 2009/0143975 | A1 | 6/2009 | Geelen |
| 2009/0143976 | A1 | 6/2009 | Geelen |
| 2009/0150063 | A1 | 6/2009 | Geelen |
| 2009/0171561 | A1 | 7/2009 | Geelen |

OTHER PUBLICATIONS

U.S. Office Action dated Dec. 8, 2009.
U.S. Office Action dated Jan. 15, 2010 corresponding to related U.S. Appl. No. 12/292,104.
U.S. Office Action from copending U.S. Appl. No. 12/292,104, dated Jul. 8, 2010.
U.S. Office Action dated Apr. 26, 2010, issued in corresponding U.S. Appl. No. 12/292,102.
U.S. Office Action dated Sep. 29, 2010 issued in co-pending U.S. Appl. No. 12/292,102.
U.S. Office Action dated Sep. 16, 2010 from co-pending U.S. Appl. No. 12/292,126.
U.S. Office Action dated Mar. 2, 2010.
U.S. Office Action dated Oct. 8, 2010 issued in co-pending U.S. Appl. No. 12/292,103.
U.S. Office Action from copending U.S. Appl. No. 12/292,098, dated Jul. 30, 2010.
U.S. Office Action dated May 25, 2010.
U.S. Office Action dated Apr. 9, 2010.
US Office Action dated Dec. 21, 2010, issued in co-pending U.S. Appl. No. 12/292,098.
US Office Action dated Dec. 23, 2010, issued in co-pending U.S. Appl. No. 12/292,126.

* cited by examiner

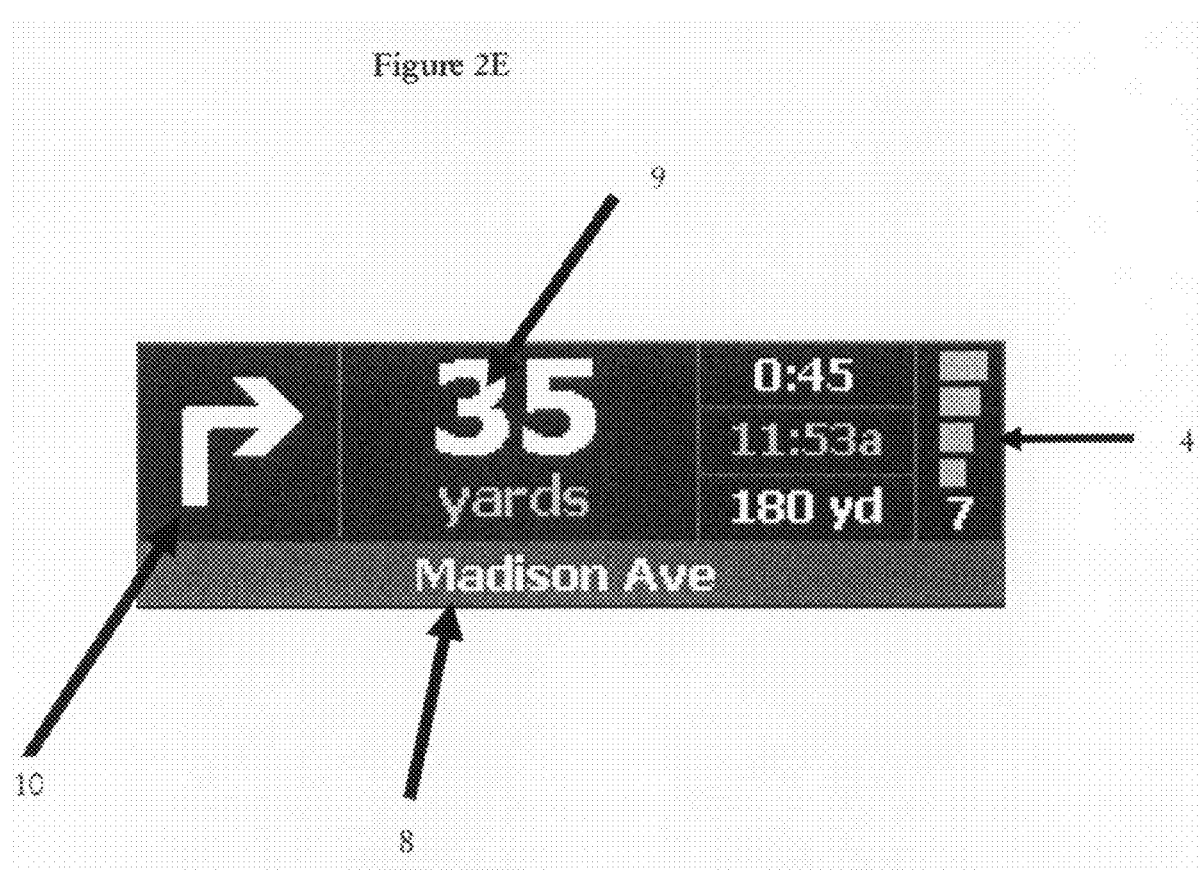

18

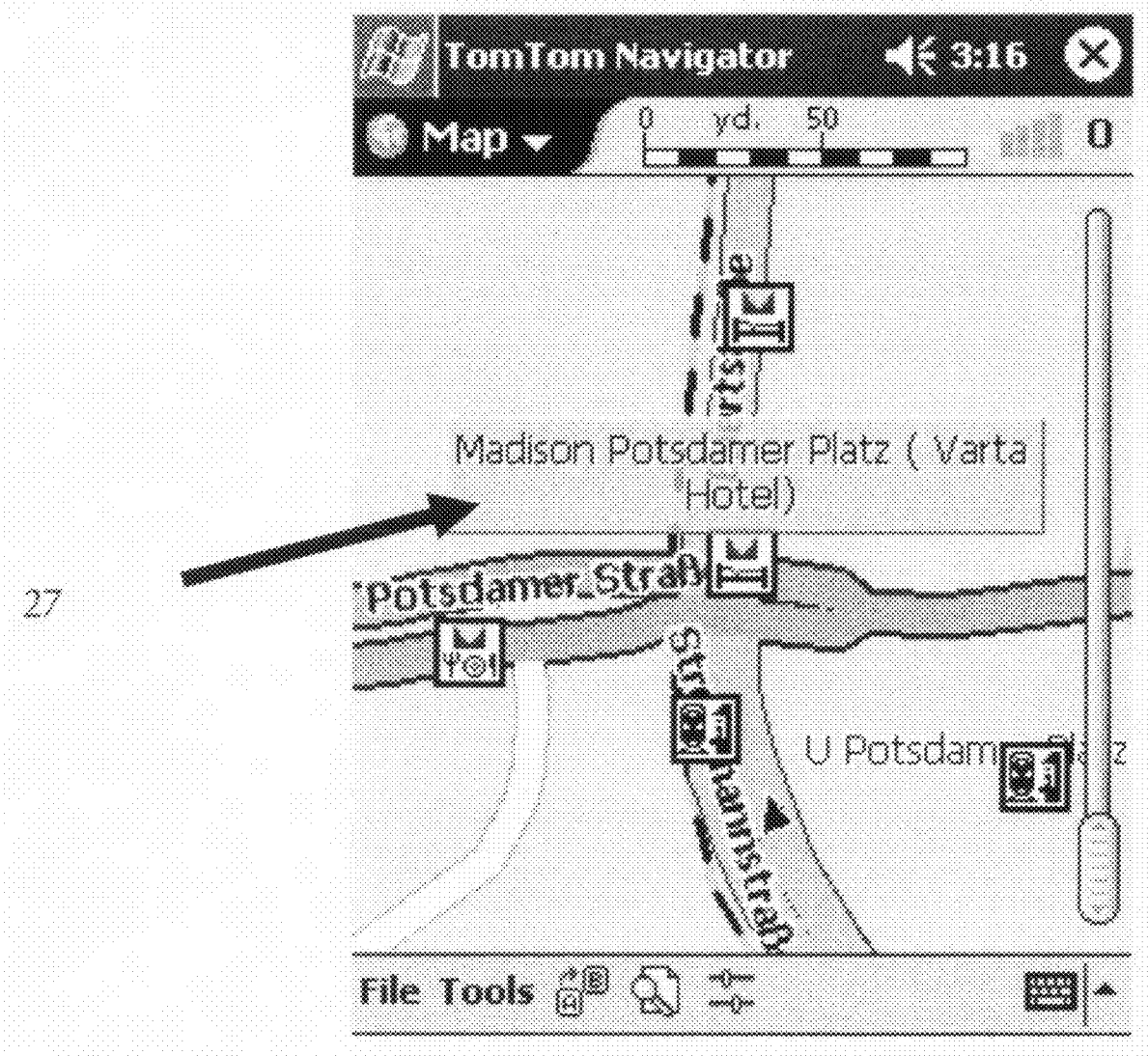

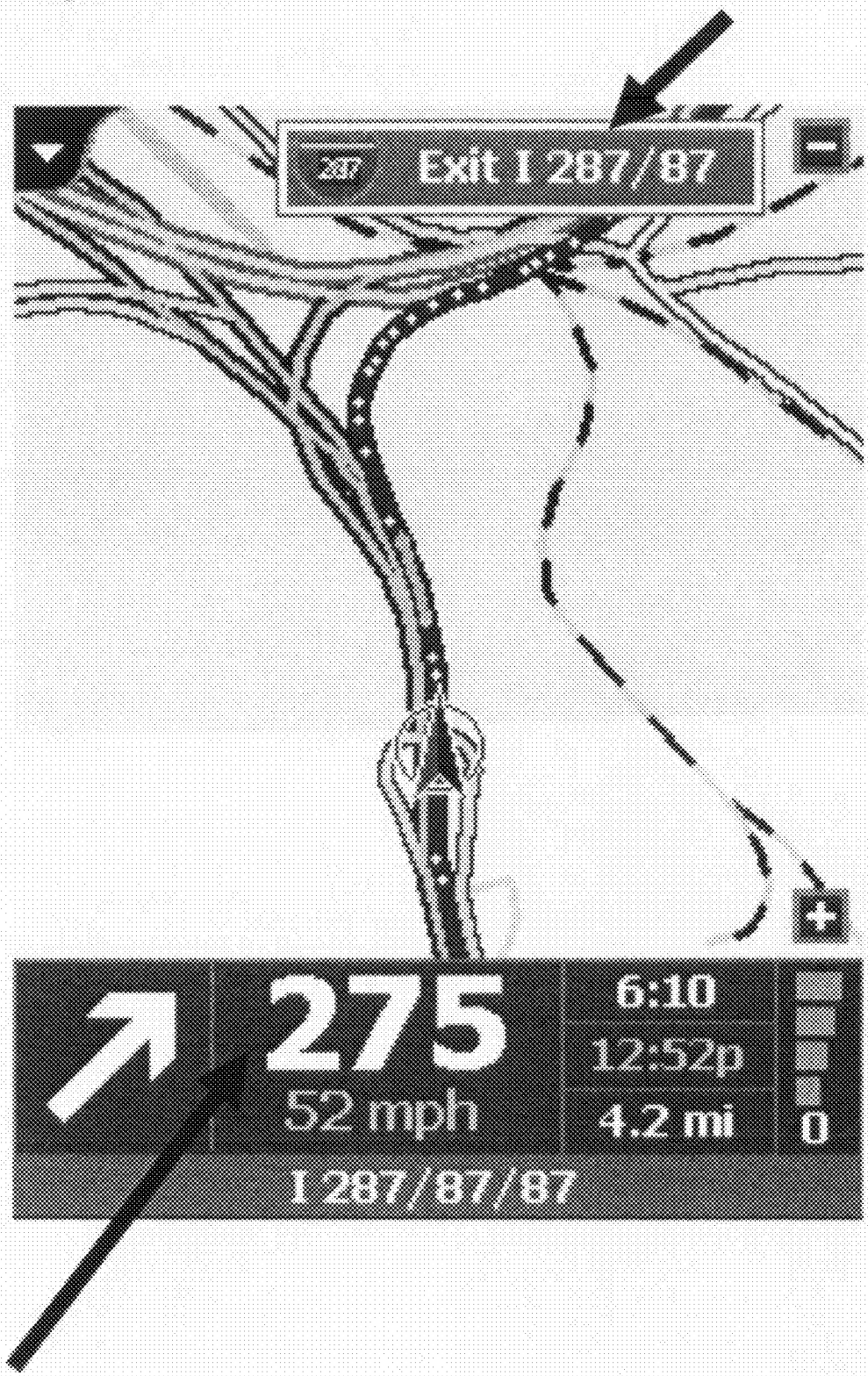

PERSONAL GPS NAVIGATION DEVICE

The present application is a continuation of and claims priority under 35 USC §120 on pending prior U.S. application Ser. No. 11/428,832 filed on Jul. 5, 2006, which itself is a continuation of and claims priority under 35 USC §120 on prior U.S. application Ser. No. 10/452,492 filed on Jun. 2, 2003, the entire contents of each of which is hereby incorporated herein by reference.

BACKGROUND OF THE INVENTION

1. Field of the Invention

This invention relates to a personal GPS navigation device. A personal GPS navigation device is any electronic device that can process GPS location data and display the location of the device on a map. The device may be a dedicated navigation device, or a general purpose electronic device, such as a personal digital assistant, smart phone, mobile telephone, laptop or palmtop computer. The device may be portable or fixed in a vehicle.

2. Description of the Prior Art

Personal navigation devices are becoming increasingly common. A particularly successful approach is to connect a PocketPC™ powered PDA (personal digital assistant) to a GPS receiver: the PDA, when running navigation software, becomes a GPS based personal navigation device. Another successful format is the dedicated GPS device, used by hikers, sailors etc. In some countries, mobile telephones will have to be equipped with a GPS receiver in order to be able to send the location of that telephone in the event of an emergency, greatly increasing the adopting of GPS technology as a mass market technology. Portable GPS receiver devices have also been used in personal safety devices as described in, for instance, U.S. Pat. No. 6,480,557 to Rog, et al. entitled "Portable GPS-receiver for a personal safety system", the contents of which are hereby incorporated by reference.

GPS device have also been incorporated into road vehicles and integrated into road map data bases to provide navigation and vehicle tracking systems as described in, for instance, U.S. Pat. No. 4,837,700 to Ando, et al. entitled "Method and apparatus for processing data in a GPS receiving device in a road vehicle" and U.S. Pat. No. 5,225,842 to Brown, et al. entitled "Vehicle tracking system employing global positioning system (GPS) satellites", the contents of both of which patents are hereby incorporated by reference.

One common feature of current personal GPS navigation devices is that they can display a GPS information screen, such as the screen shown in FIG. 1B. The GPS information screen shows: how many GPS satellite signals are being received and their individual strength at 3a; the location co-ordinates of the device at 3b; the speed of the device at 3c; the direction of movement of the device at 3d; the relative orientation of GPS satellites that a signal is being picked up from at 3e. The GPS information screen is useful when getting a first GPS fix. Once a fix has been established, most users then switch to the map mode, which causes a map to be displayed on the screen of the personal navigation device, indicating the location of the device with an arrow.

SUMMARY OF THE PRESENT INVENTION

In a first aspect, a personal GPS navigation device is programmed to display, at the same time, each of the following:
  (a) a map;
  (b) an indication of the current position of the device on the map; and
  (c) a GPS signal strength indicator.

Hence, the device differs from the prior art in displaying a GPS signal strength indicator at the same time as the navigation map (e.g. when the device is in navigation mode) and hence does not require a user to leave the navigation mode to call up a separate GPS information screen in order to see the GPS signal strength. This is very useful, particularly for ordinary consumers, who can see at a glance if the reason that location tracking has been lost is because the received GPS signals are inadequate. (The approach is similar to how network coverage is shown on both the idle screen of a cellular mobile telephone and when a voice call is being made: it is very useful to have the strength of the network coverage graphically represented on the screen that is seen when actually about to make/receive or actually making a voice call.)

In one implementation, the GPS signal strength indicator comprises several bars, with all bars being visible if the strength of the received GPS signal exceeds a predefined requirement and none visible if the GPS signal strength is below a second predefined requirement. The term 'bar' should be expansively construed to cover any region, icon, graphic of any shape that can visually represent a signal strength level. The GPS signal strength indicator can be part of the main display used to display the map or can be discrete, separate hardware entirely, such as LED indicators on the housing of the device. A bar is 'visible' if it is readily visually differentiated from other bars; these other bars may still be visually apparent, but in a less prominent manner than a 'visible' bar.

BRIEF DESCRIPTION OF THE DRAWINGS

The present invention will be described with reference to the accompanying drawings, in which

FIG. 2E is an expanded view of the navigation bar from an implementation, showing the GPS signal strength indicator in more detail;

FIGS. 7A-7E are screen shots from an implementation showing how actions can be associated with a Point of Interest icons;

FIG. 10A is a screen shot from an implementation showing how the next major route change is displayed;

DETAILED DESCRIPTION

Figure 1A:
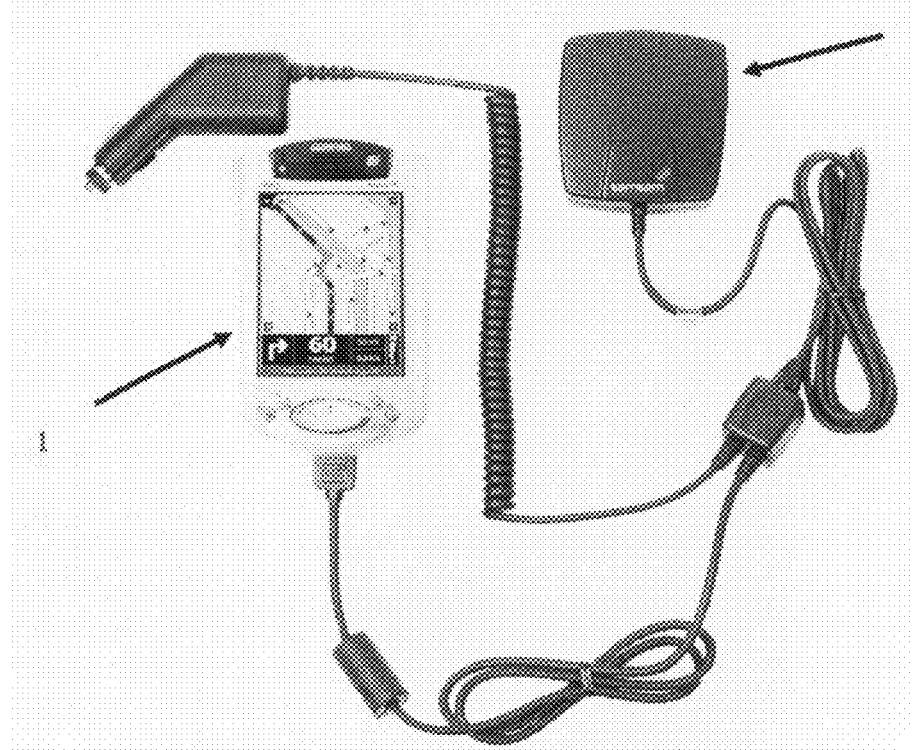
FIG. 1A is a photograph of a personal GPS navigation device according to the present invention.
Figure 1B:
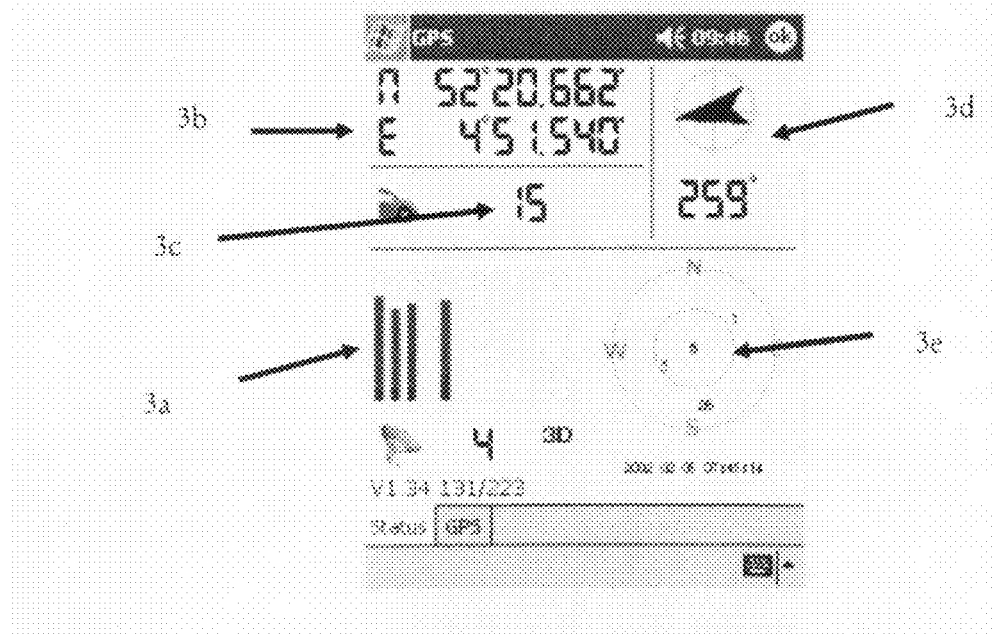
FIG. 1B is a prior art GPS information screen.
Figure 2A:
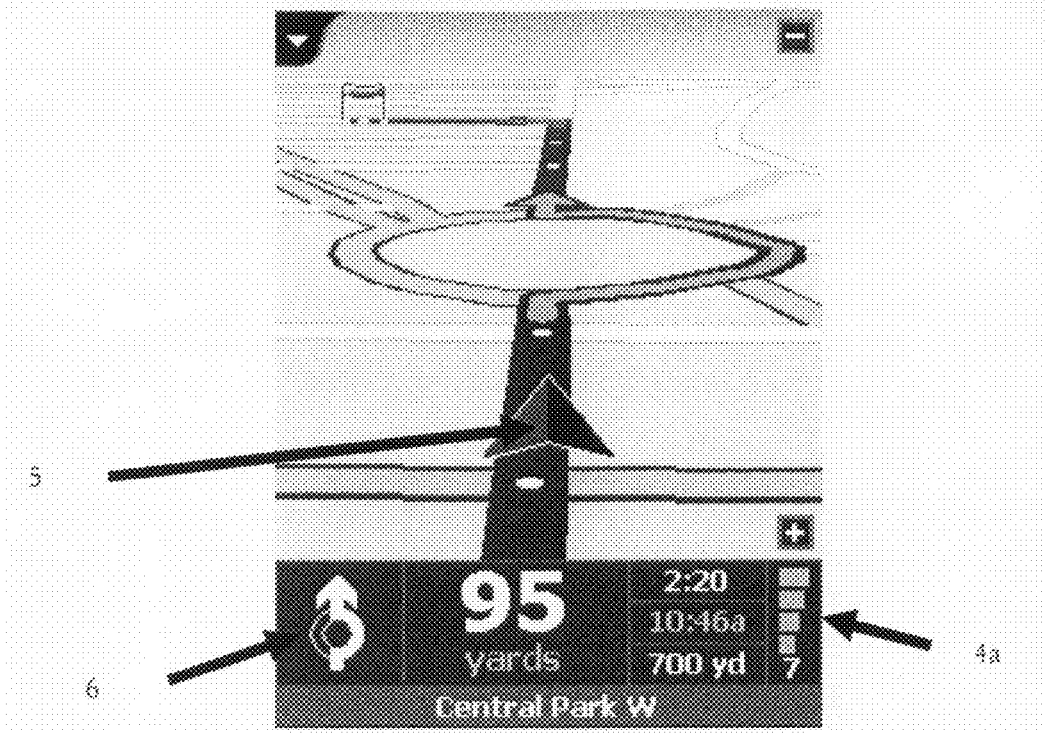
FIGS. 2A-2D are screen shots from an implementation showing a GPS signal strength indicator at varying levels.
Figure 2B:
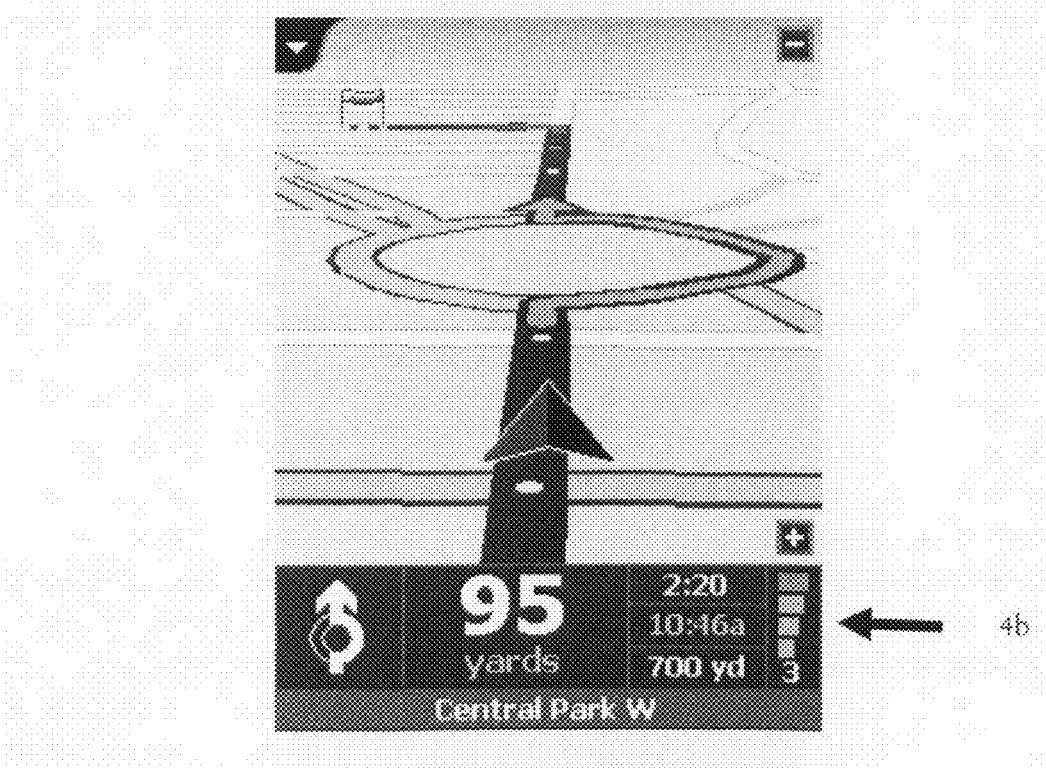
Figure 2C:
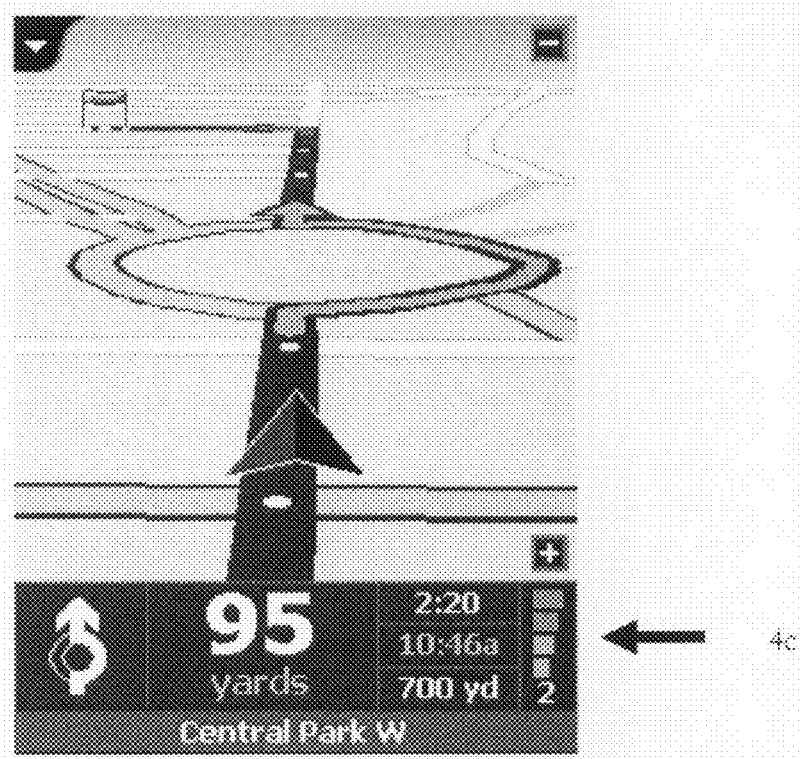
Figure 2D:
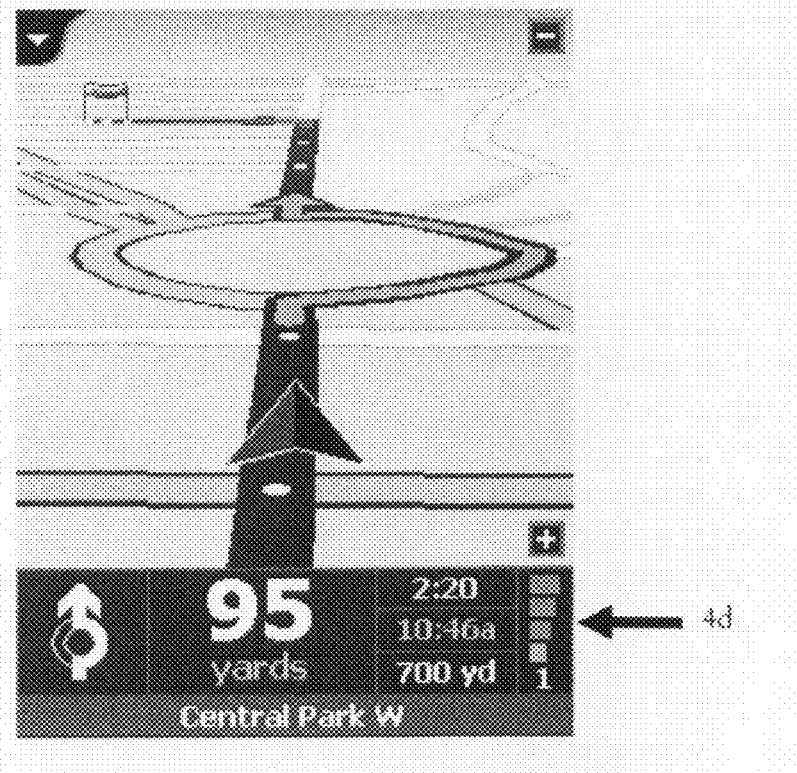

The present invention will be described with reference to an implementation from Palmtop Software BV of Amsterdam, Netherlands called TomTom Navigator™. Referring to FIG. 1, the TomTom Navigator GPS system runs on a PocketPC powered DPA, such as the Compaq iPaq 1 and comprises a GPS receiver 2 and navigation software running on the Compaq iPaq 1.

In the TomTom Navigator GPS system, routes/roads are described in a database running on the personal GPS navigation device as lines—i.e. vectors (i.e. start point, end point, direction for a road, with an entire road being made up of many hundreds of such sections, each uniquely defined by start point/end point direction parameters). A map is then a set of such road vectors, plus points of interest (POIs), plus other geographic features like park boundaries, river boundaries etc, all of which are defined in terms of vectors. All map features (e.g. road vectors, POIs etc.) are defined in a co-ordinate system that corresponds or relates to the GPS co-ordinate system, enabling a device's position as determined through a GPS system to be located onto the relevant road shown in a map.

Route calculation uses complex algorithms applied to score large numbers of potential different routes. Once a route is calculated by the PDA, the PDA in effect has stored in a database a sequence of road names and actions to be done at pre-determined distances along each road of the route (e.g. after 100 meters, turn left into street x).

1. GPS Signal Strength Indicator

FIGS. 2A-D show a typical navigation screen (aerial view) created by the TomTom Navigator GPS system for a vehicle driving down Central Park West in New York, N.Y., USA. The position of the vehicle is given by the arrow 5. A navigator bar, indicated generally at 6, includes essential navigation information. It also includes a GPS signal strength indicator 4. The GPS signal strength indicator 4 is visible in normal navigation mode and hence there is no need to task away to a separate GPS information screen to see this information; minimising the need to task away from the main navigation mode screen (showing the map and current vehicle location) is very useful as the device is meant to be used as an in-vehicle navigation system and driver distractions need to be at a minimum. Further, its apparent similarity to the familiar network coverage indicator in a mobile telephone screen makes it an easily understood user interface element.

The GPS signal strength indicator 4 consists of 4 bars with the following functional meanings:
- 4 bars visible: Received GPS signal is strong enough to give 3D fix at high level of accuracy (FIG. 2A)
- 3 bars visible: Received GPS signal is strong enough to give a 3D fix; (FIG. 2B)
- 2 bars visible: Received GPS signal is strong enough to give a 2D fix (FIG. 2C)
- 1 bar visible: Received GPS Signal is present, but not strong enough to obtain a position fix (FIG. 2D)
- 0 bars visible: No signal detected.

FIG. 2E shows the navigation bar 6 in more detail. It includes the following:
- GPS signal strength indicator 4. An indication of the number of satellites from which GPS signals are being received is also given—in this case 7.
- Name 8 of the current road or route being traveled along Madison Avenue in this case)
- Distance to next turning to be taken 9 (35 yards in this case)
- Nature of next turning to be taken 10 (in this case, a right turn).

Further UI Features

The following features are also present in the TomTom Navigator GPS system. Each may be used independently of any other feature (and independently of displaying the GPS signal strength indicator with the map in navigation mode).

2. Ability to Download POI

POIs are points of interest, such as museums, restaurants, petrol stations etc. The TomTom Navigator GPS system comes pre-loaded with several thousand POIs, which can automatically appear on a displayed map. POIs exist as a POI type and a longitude and latitude position in the TomTom Navigator GPS system database resident on the device.

Figure 3:
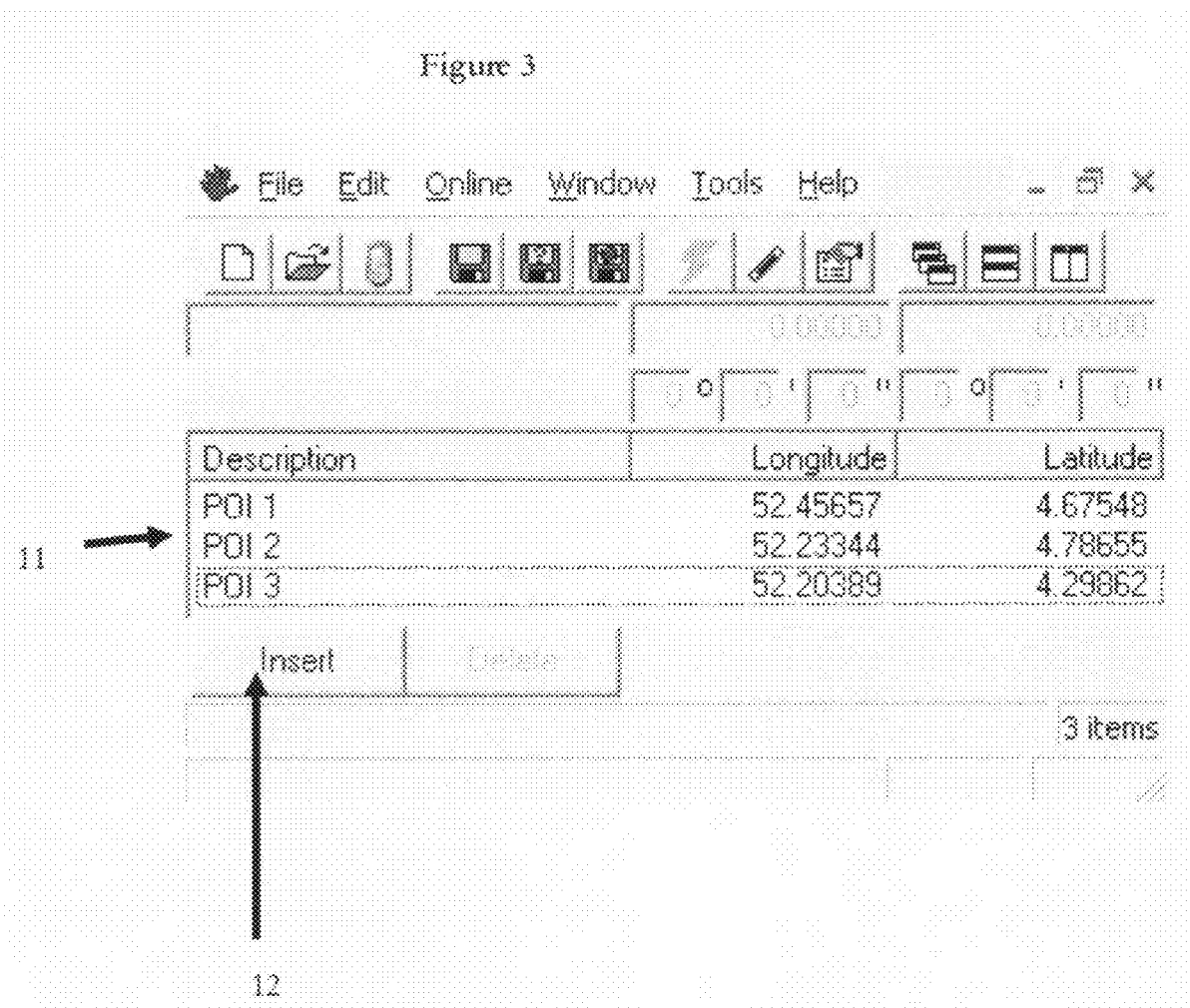
FIG. 3 is a screen shot from an implementation showing how Point of Interest data can be inserted into a database running on the device.

An enhancement to the conventional use of POIs is to enable them to be downloaded to the device (e.g. over the internet or a wireless connection (using SMS or WAP etc) and inserted into the database. FIG. 3 shows the menu screen listing three new POIs 11, with location data; the user can choose to insert these into his database by selecting the 'insert' button 12.

This approach enables third parties to supply POIs from a remote database over a WAN, with possibilities for promoting different POIs. For example, a national chain of gas stations could allow users to download to their personal GPS navigation devices the location of all of its gas stations, which could then be displayed with the correct logo at the correct map locations. The logos could also animate to draw attention to themselves. Location based advertising is also possible (for example, a department store with a sale on could allow POIs of its stores with a special 'Sale' logo to be downloaded). User can also create their own new categories of POIs and exchange them with others: hence, POIs for special interest categories can evolve, driven by the needs of users. An example might be that photographers could generate POIs for locations with outstanding views and store these POIs on not only their own personal GPS navigation devices, but also exchange them with other photographers. Motorists could identify particularly enjoyable roads with a new POI type and exchange these with others. Virtually any kind of location information can be categorised with a POI and hence captured in the TomTom Navigator GPS system database resident on the device for display on a map and also exchange with other users.

3. POI Selection

Proliferating the nature of possible POI stored could lead to considerable screen clutter, with much irrelevant information. Printed maps, for example, frequently include too much POI data, making it difficult to find a specific kind of POI of interest.

Figure 4A:
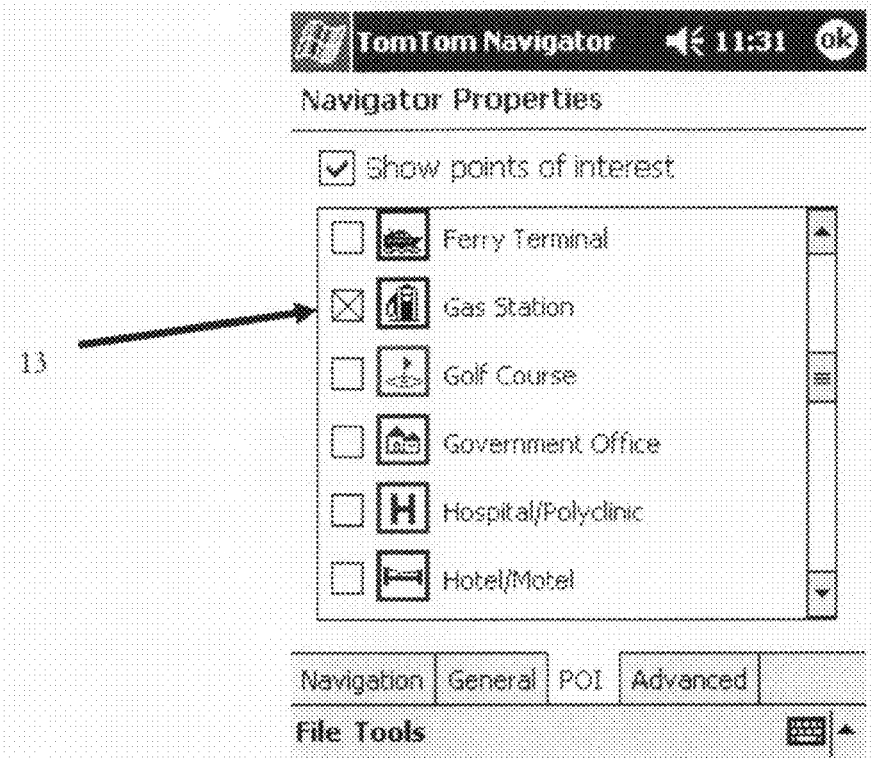
FIGS. 4A-4B are screen shots from an implementation showing how different kinds of Point of Interest icons can be selectively enabled/disabled for display.
Figure 4B:
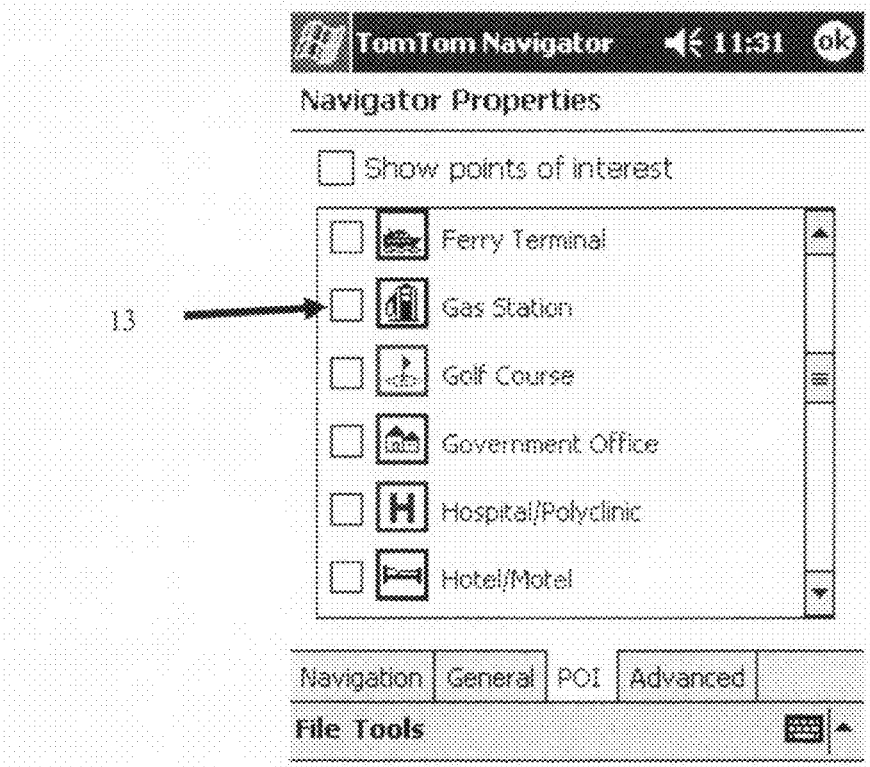

The TomTom Navigator GPS system addresses this by listing all POI types and allowing the user to select which particular types are to be displayed: FIGS. 4A and 4B show a typical selection of POI types; only the checked item(s) will be displayed on a map: in this case, only gas stations, as shown in FIG. 4A since only the gas station POI check box 13 is selected. FIG. 4B shows that check box de-selected: no gas stations will now be displayed on the map in navigation mode.

4. POI Prioritization

Figure 5A:
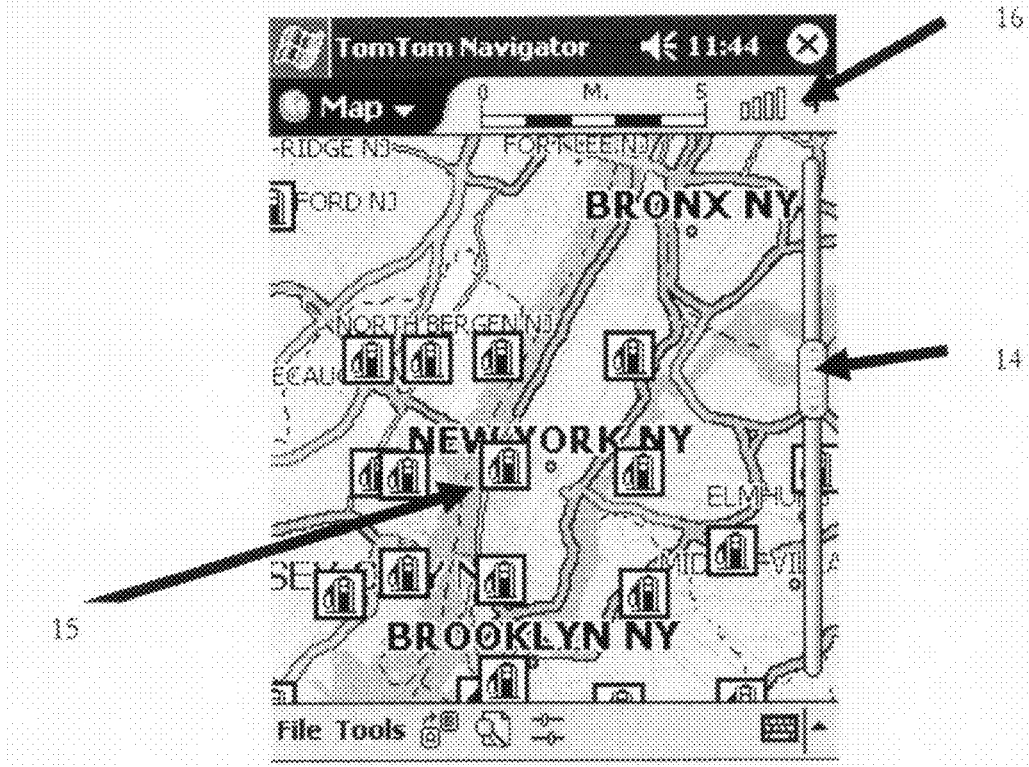
FIGS. 5A-5E are screen shots from an implementation showing how Point of Interest icons can be prioritised to reduce screen clutter.
Figure 5B:
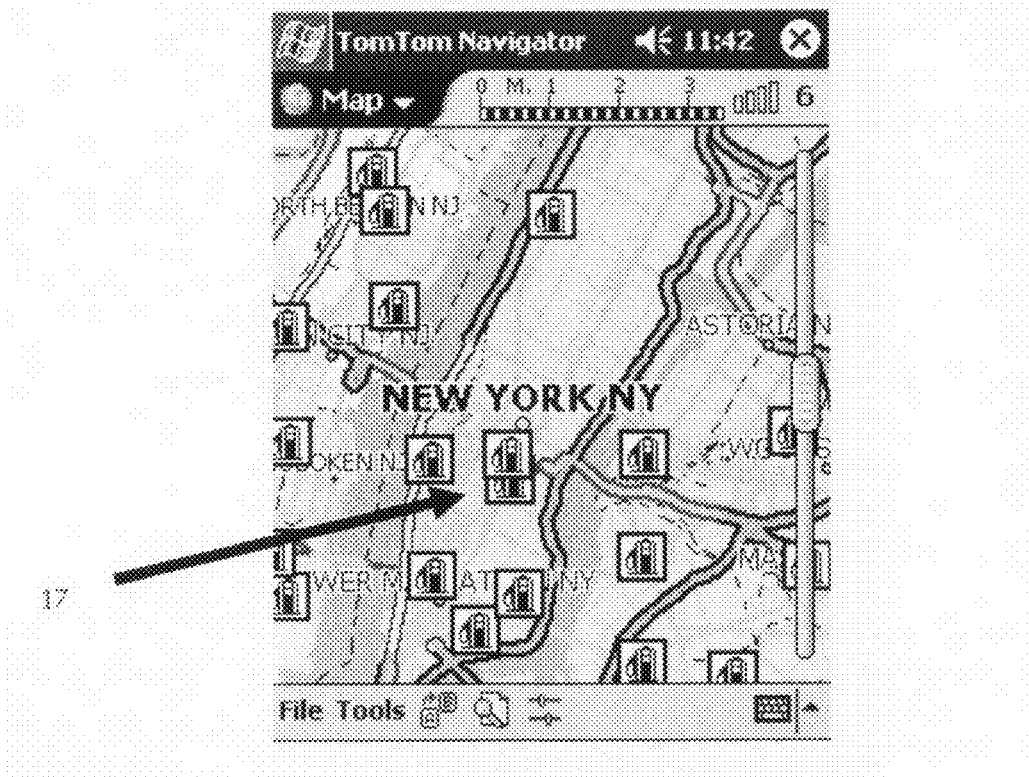
Figure 5C:
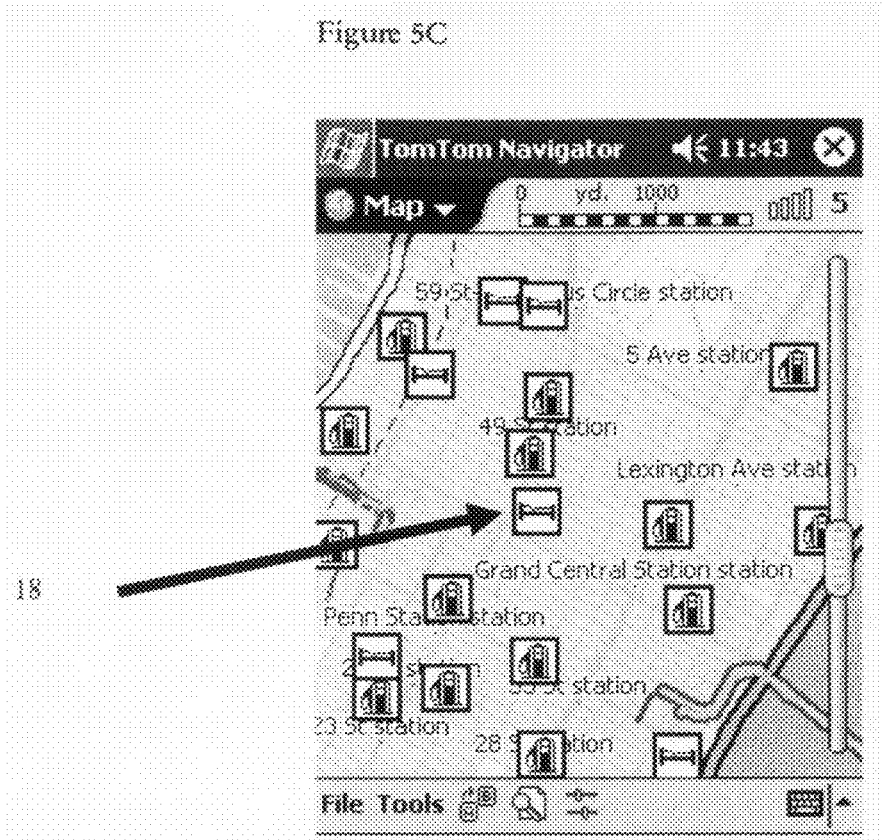
Figure 5D:
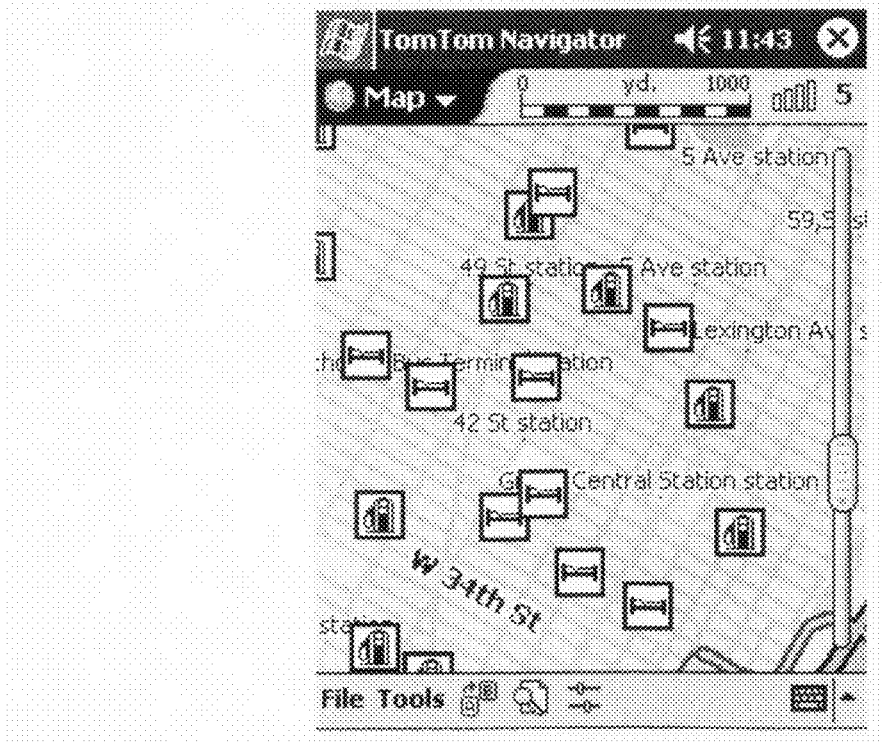
Figure 5E:
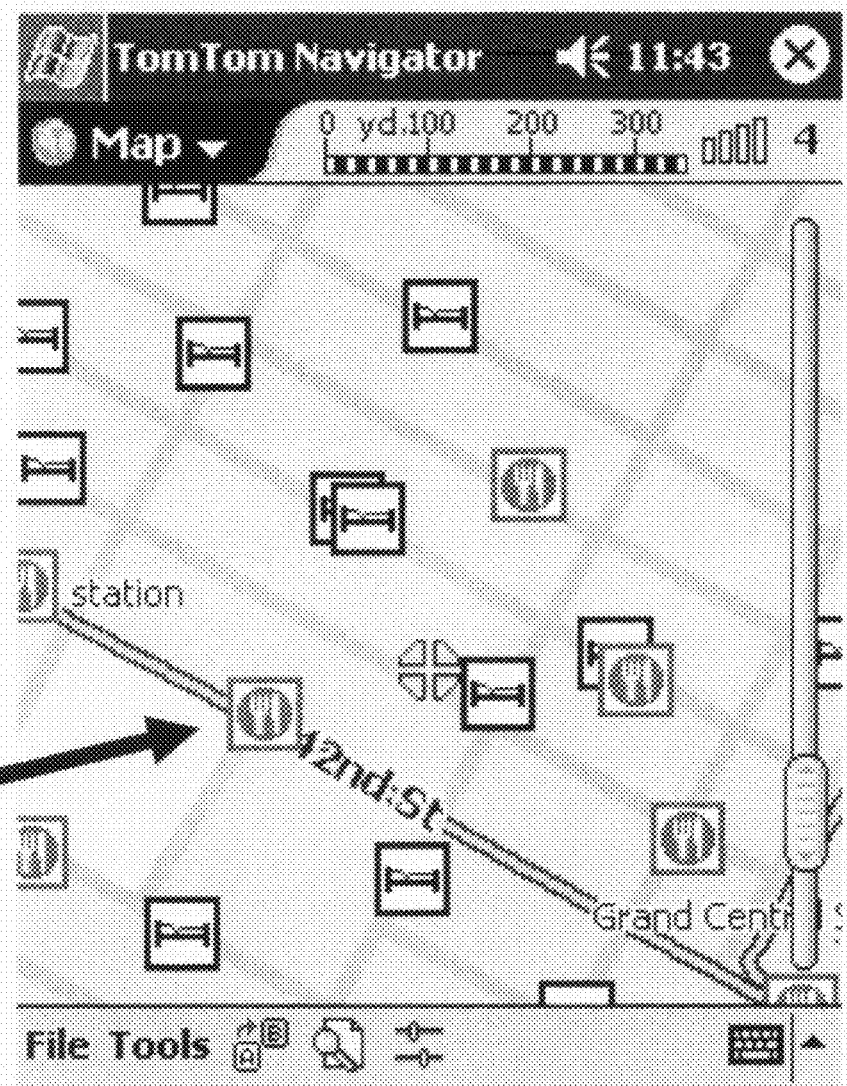

The TomTom Navigator maps are divided into grid cells Navigator 1.0, for instance, uses a 4×5 grid). Within each cell, only a single POI is displayed on a map at a time. This reduces screen clutter. FIGS. 5A-E show a map of New York at progressively greater enlargement; enlargement is increased by the user moving the zoom control 14 down. Hence, in FIG. 5A, there is a single gas station indicated as being present in the central Manhattan area 15. (As an aside, it should be noted that GPS signal strength indicator is still apparent at 16). Zoomed in, as shown in FIG. 5B, there are three gas stations 16 in central Manhattan. Zoomed in still further, as shown in FIG. 5C, there are many more now shown, plus POIs of other types, such as hotels (the bed icons, 18). Zooming in further still, FIG. 5D, shows even more POIs. Further still, FIG. 5E, shows restaurants (icon 19), as well as all hotels.

This logical introduction of different POI types, dependent on the zoom level is based on certain POIs (low-density POIs, like gas stations and amusement parks) being displayed in priority over others (high density POIs like restaurants). Further, certain high-density POIs are not displayed at all any more if you zoom out beyond a certain threshold (e.g. no restaurant POIs if map shows more than a certain number of square miles).

5. Moving POIs

Figure 6A:
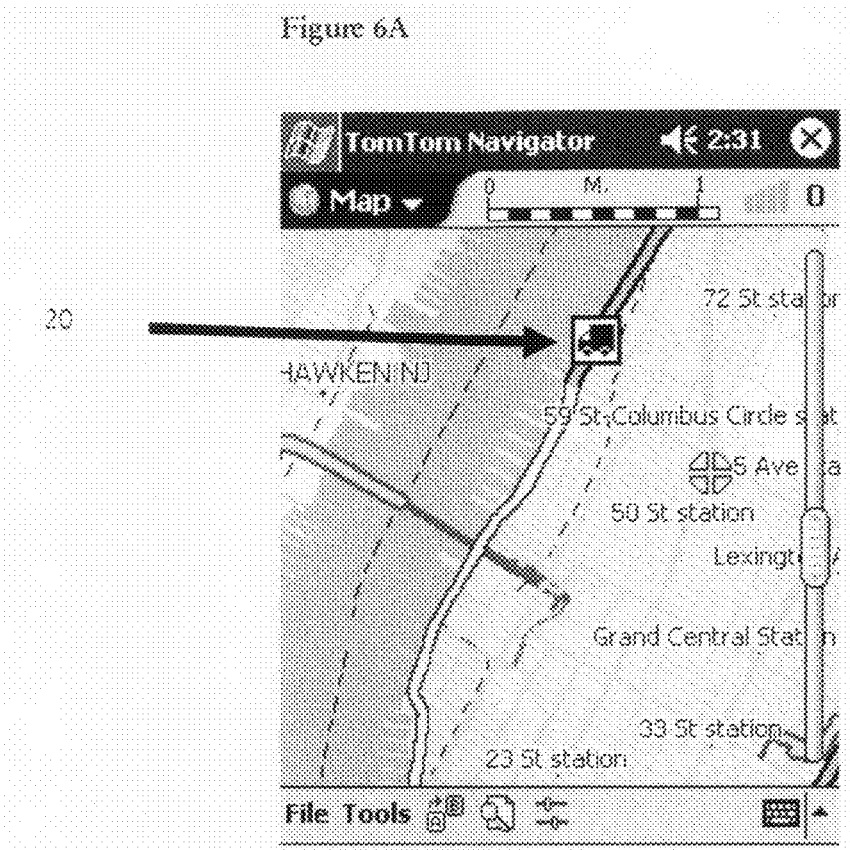
FIG. 6A-6B are screen shots from an implementation showing how moving Point of Interest icons can be displayed.
Figure 6B:
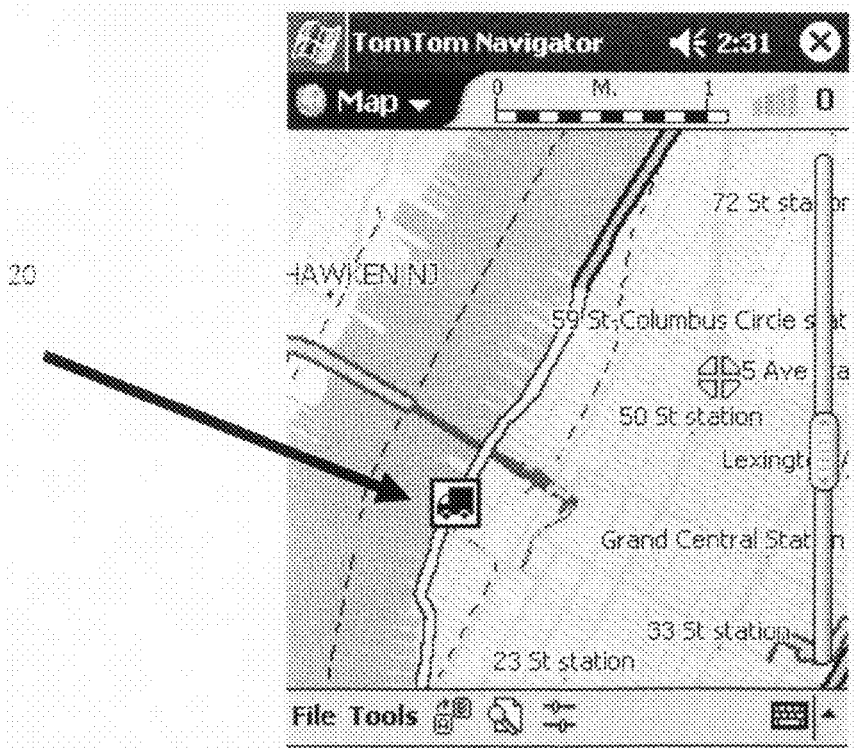

Another useful feature of the TomTom Navigator GPS system is that POIs do not need to have a fixed location in the database: their location in the database can be regularly, continuously or occasionally updated to show a new location; when this happens, the associated POI icon's position on the map will automatically move to the newly defined location. This feature is useful for tracking assets (e.g. vehicles; people too) and utilises the feature note earlier of sharing POI data: a vehicle could send regular SMS messages with its current location (using its own GPS system) to a mobile telephone equipped personal GPS navigation system, which could then use the location co-ordinates in the SMS message to update a POI uniquely associated with that vehicle. As the vehicle location alters, its position will change on the map, as shown in FIGS. 6A and 6B, where truck 20 can be seen moving down the route. Hence, a very low cost, yet sophisticated, asset tracking system can be deployed using this approach.

6. Associating an Action with a POI

Selecting a POI can trigger a related action, such as opening a window with information about or functions relating to the POI, or a communication application that enables the user to call/text etc. that POI, or a browser window that opens a web page relating to that POI. Triggering may be direct or indirect (i.e. there are intervening steps).

Figure 7A:
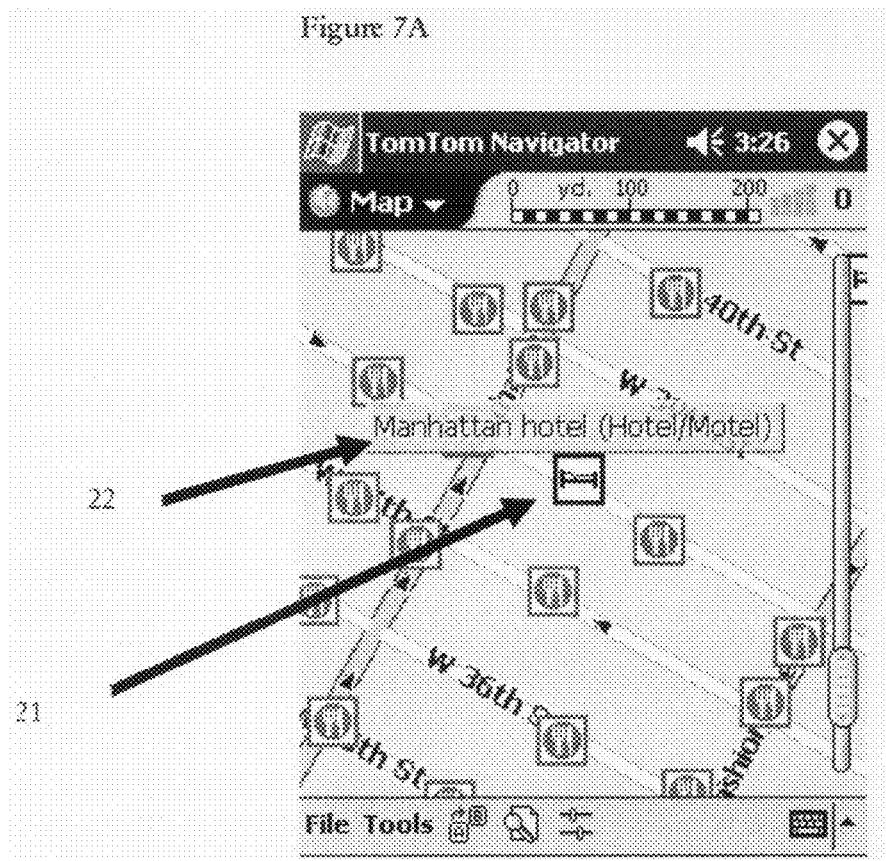
Figure 7B:
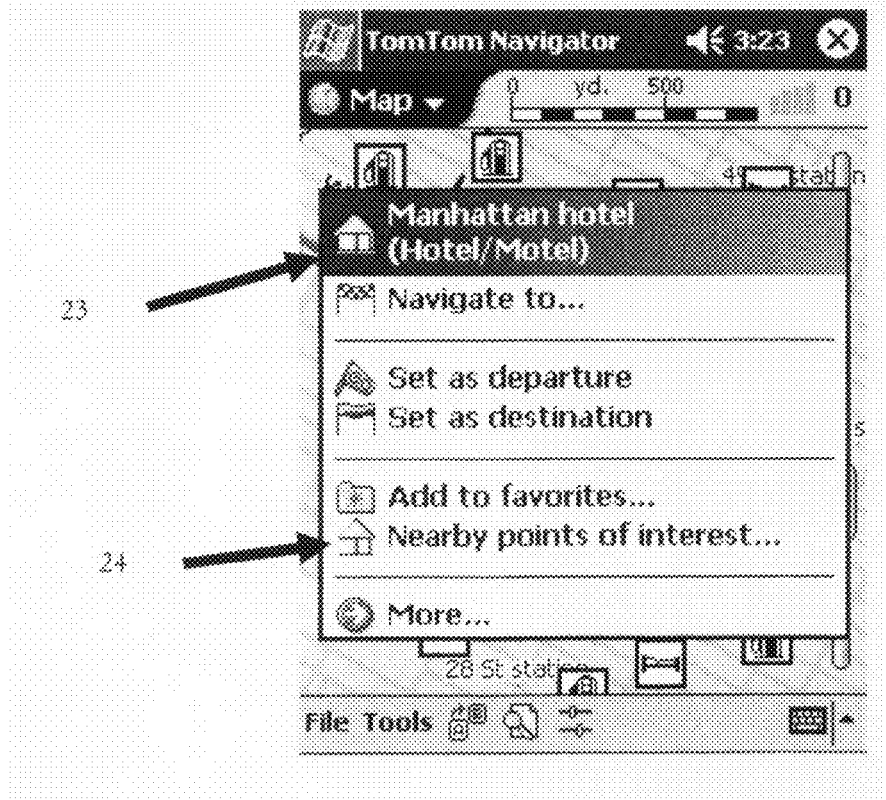
Figure 7C:
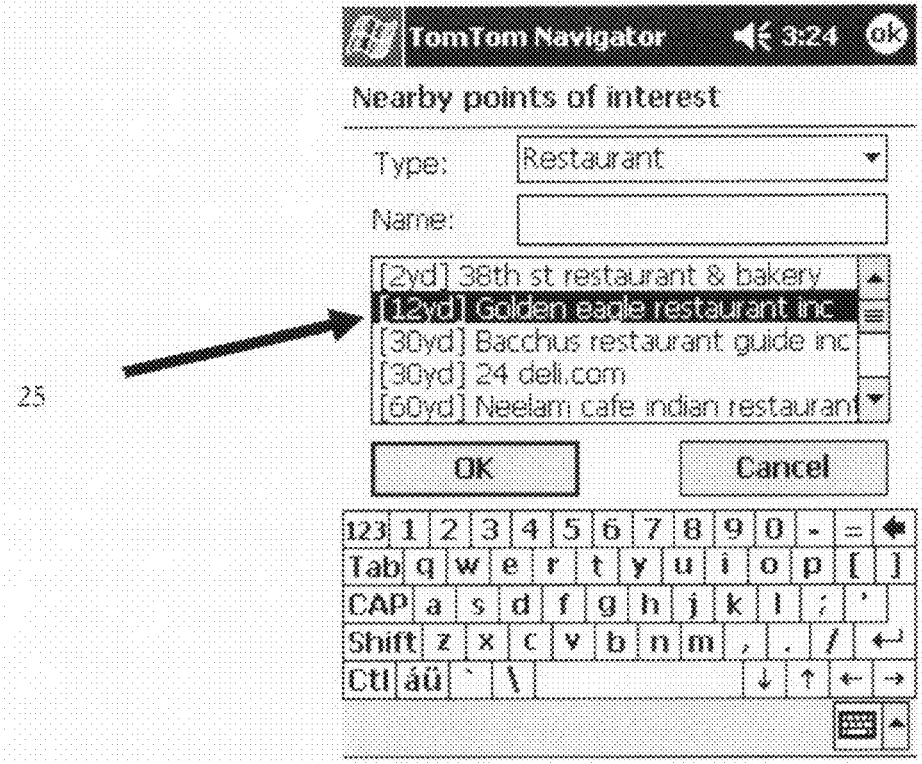
Figure 7D:
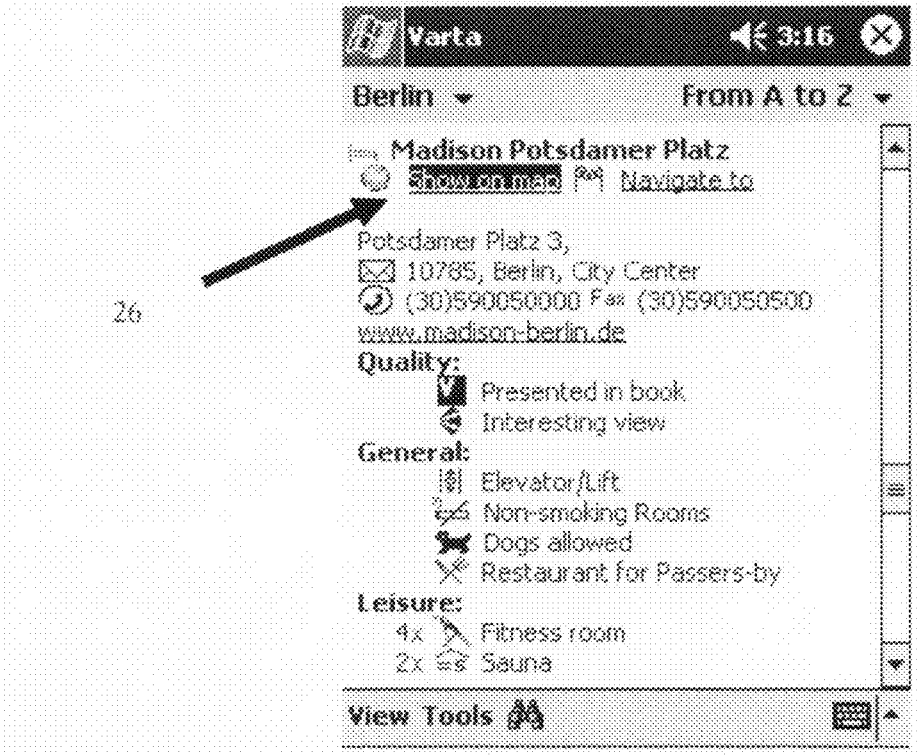

FIGS. 7A and 7B illustrate opening a window with functions relating to the POI—in FIG. 7A, the user has selected the icon for Manhattan Hotel 21: when he does this, the name of the hotel 22 is displayed above the hotel POI icon. When the user selects the name 22, pop up menu list (23 in FIG. 7B appears). Window 23 lists various functions relating to the Manhattan Hotel, such as navigating to it (i.e. making it the destination for a route calculation algorithm; the TomTom Navigator software then calculates a route from the current location to the Manhattan Hotel). Another option is "Nearby points of interest" 24; if selected, a list of nearby POIs is shown, FIG. 7C, in ascending order of distance from the hotel. The user can see that 12 yards from the Manhattan Hotel is the Golden Eagle restaurant 25. If the user selects this entry 25, then more information on it is shown, including various contact numbers. FIG. 7D shows the information for a different hotel, this time in Berlin; if the user selects the web URL, then the device opens a browser window and opens the requested web page. If the user touches the telephone number, it is automatically called (assuming the device has phone capabilities). If the user selects the 'Show on map' item 26, the hotel 27 is shown again on the map, a seen in FIG. 7E.

7. Auto-Zooming of Map as Car Nears a Decision-Point

Another feature is that the map will automatically zoom-in when approaching a decision point, such as s turning, roundabout, intersection, merge etc. This ensures that the user can see detail when he needs it, without giving too much detail when it is not needed.

Figure 8A:
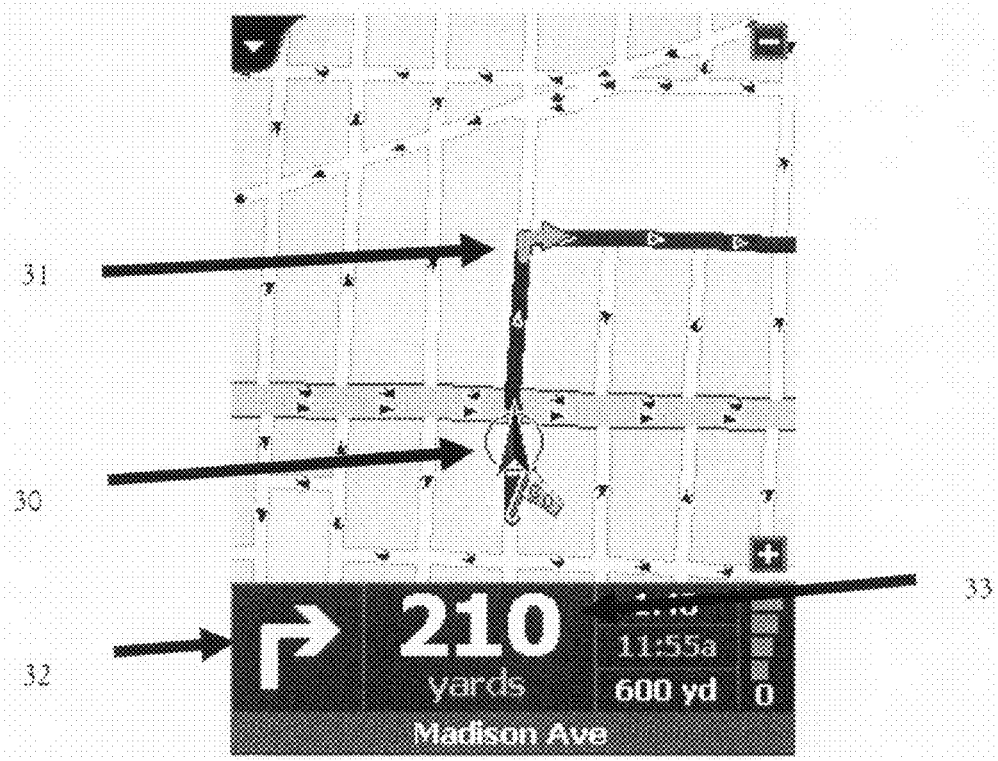
FIGS. 8A-8D are screen shots from an implementation showing how map auto-zooming occurs when approaching a decision point.

FIGS. 8A-D show the user 30 turning right. In FIG. 8A, the user 30 can see that there is a right turn ahead from the map at 31 and from the right turn arrow 32 on the navigation bar. The navigation bar shows that the turning is 210 yards ahead 33.

Figure 8B:
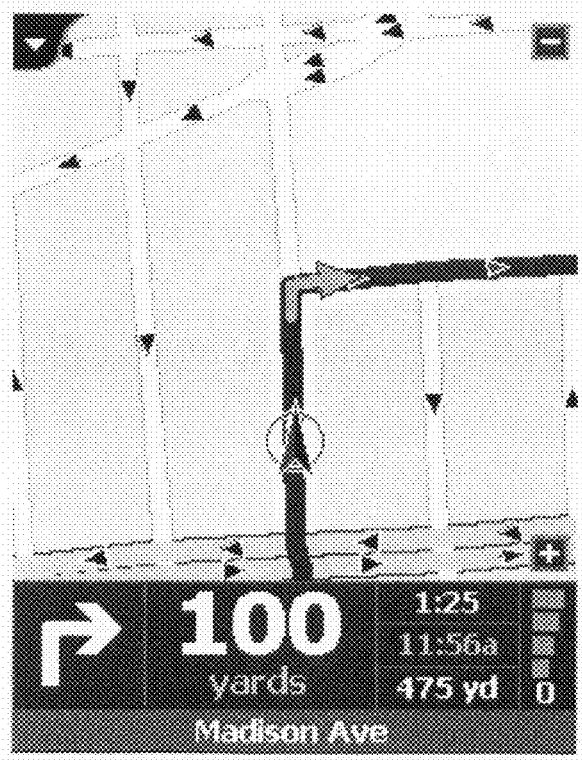
Figure 8C:
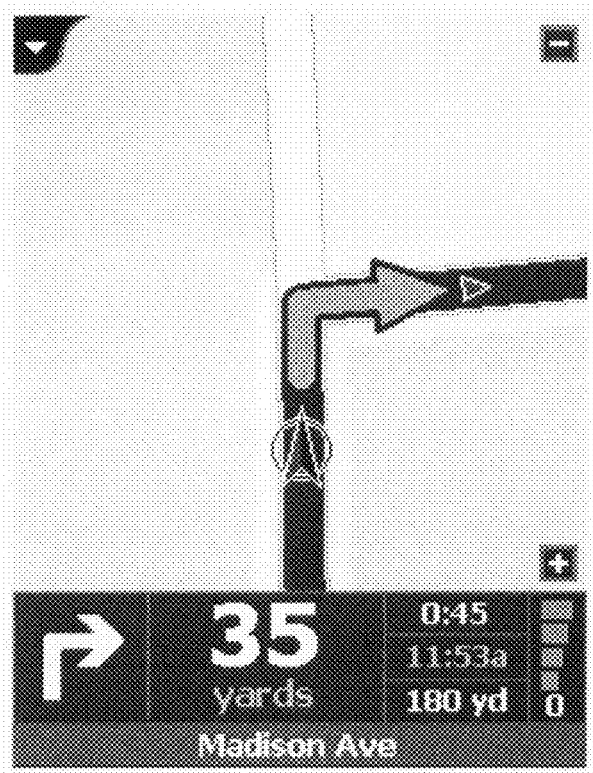
Figure 8D:
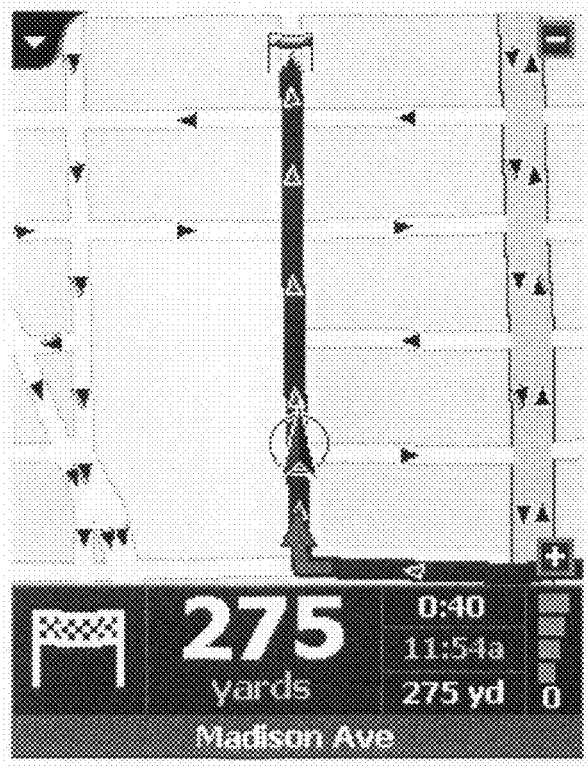

As the user approaches the turn, the map progressively and automatically zooms in so that, at 100 yards from the turning, FIG. 8B, the scale is considerably greater. 35 yards from the turning, FIG. 8C, and the scale has increased even more. After the turn has been completed, the zoom returns to its default zoom level, FIG. 8D.

8. Auto-Zooming Depending on the Speed of the Car

Figure 9A:
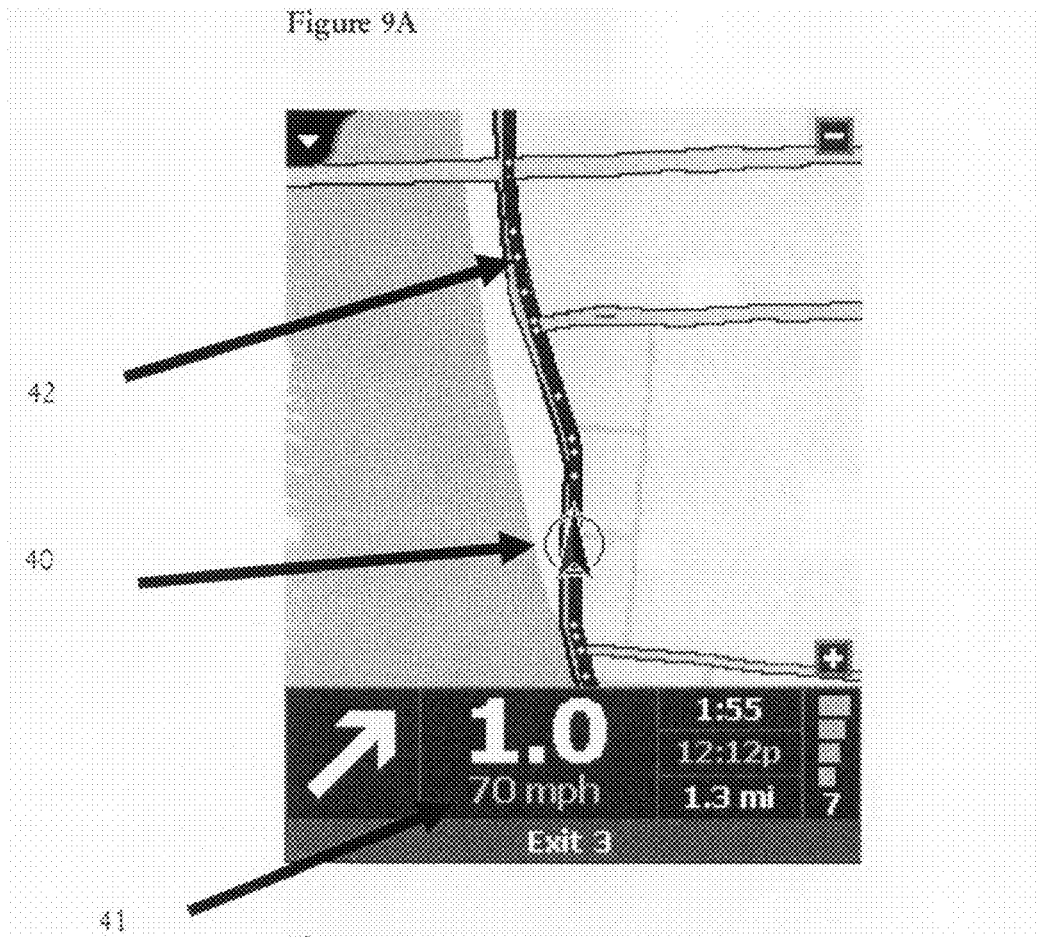
FIGS. 9A-9B are screen shots from an implementation showing how the map simplifies at higher speeds.
Figure 9B:
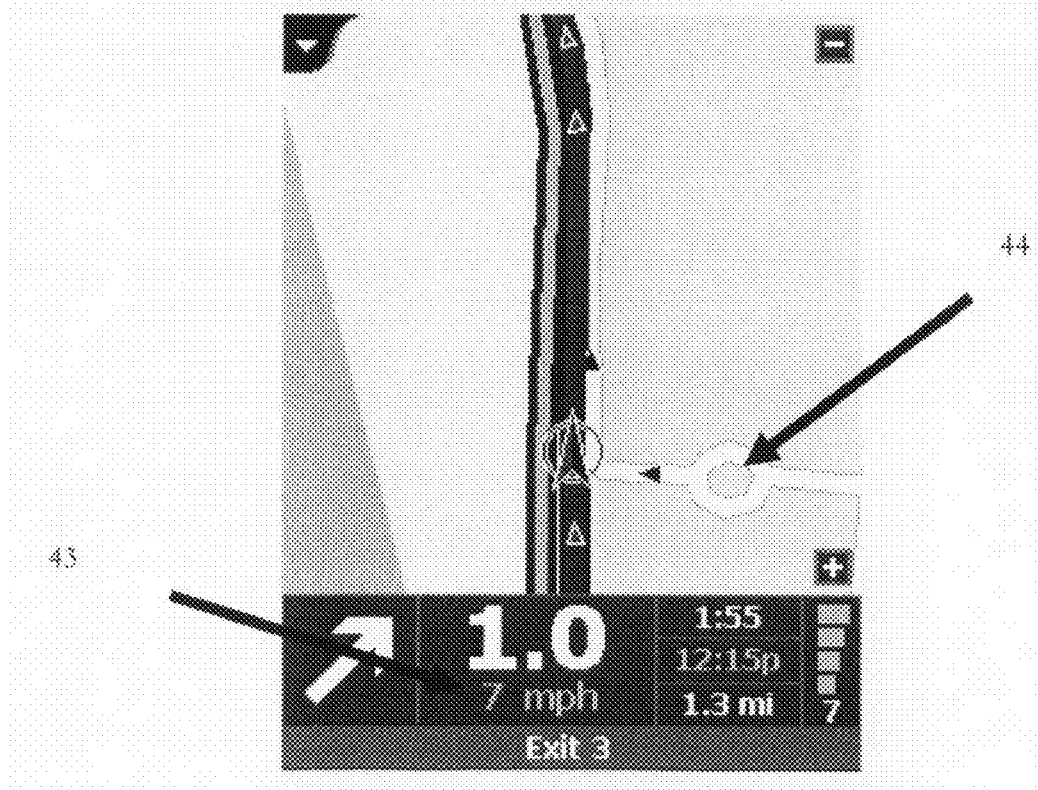

FIG. 9A shows the vehicle 40 travelling at 70 mph (see navigation bar at 41) along route 42. If the user were instead travelling at 7 mph, as shown in FIG. 9B, then the map would be automatically zoomed in to show more detail. This ensures that the user can see the map extending far enough ahead to allow timely decisions to be made. In effect, the user sees a certain number of seconds ahead rather than a certain distance.

9. Screen Simplifies Above User Defined Speed

A related feature is that the screen simplifies above speed (which may be user defined): this reduces unnecessary screen clutter and fast moving but irrelevant detail. Hence, in FIG. 9B, roundabout 44 is shown as the user is travelling slowly at 7 mph; but in FIG. 9A, the roundabout detail is not shown at al as the vehicle is travelling at 70 mph.

10. Show Next Major Route Change

FIG. 10A shows how the TomTom Navigator system can display the next major route change. In FIG. 10A, it is exiting interstate highway 287/87: window 50 summarises this. This shows a user departing from familiar territory (e.g. home) that the main purpose of many coming instructions is to take him to a certain highway exit. Allows driver to relax on long motorway journey since he can see at a glance that his exit is still 275 miles 51 away.

This feature can also show a user that the main purpose of many coming instructions is to take him to a certain highway—which allows him to follow the road signs rather than the instructions.

11. Nightview

Figure 11A:
FIGS. 11A-11B are screen shots from an implementation showing how a night mode display appears.
Figure 11B:

The conventional navigation mode view, FIG. 11A, can be replaced with a night view mode, FIG. 11B, which uses a light road against darker surroundings, plus lower brightness and very muted colors. The glare of the normal (daylight) colours, and the total amount of light coming from the whole PDA screen, can be bothersome and maybe even dangerous when the user drives at night).

APPENDIX 1

Navigator 2.0 Features

The following new features are present in the Navigator 2.0 software; this software runs on a Pocket PC powered PDA, such as the Compaq iPaq and provides a GPS based navigation system when the PDA is coupled with a GPS receiver. The combined PDA and GPS system is designed to be used as an in-car navigation system.

| FEATURE | COMMENT |
| --- | --- |
| Demonstrate route function | Allows user to see the entire proposed route in animated fashion as if he is driving it. A fun feature, but also very useful for point-of-sale purposes to catch the eye of potential purchasers of the Navigator software and GPS system. |
| | The user inputs his start position and required destination in the normal manner into the Navigator software running on the PDA. |

-continued

| FEATURE | COMMENT |
|---|---|
|  | The user then selects the manner in which a travel route is calculated: various modes could be offered, such as a 'fast' mode that calculates the route very rapidly, but the route might not be the shortest; a 'full' mode that looks at all possible routes and locates the shortest, but takes longer to calculate etc. Other options are possible, with a user defining a route that is scenic—e.g. passes the most POI marked as views of outstanding beauty, or passes the most POIs of possible interest to children or uses the fewest junctions etc.<br>Roads themselves are described in the database as lines—i.e. vectors (i.e. start point, end point, direction for a road, with an entire road being made up of many hundreds of such sections, each uniquely defined by start point/end point direction parameters). A map is then a set of such road vectors, plus points of interest (POIs), plus other geographic features like park boundaries, river boundaries etc, all of which are defined in terms of vectors. All map features (e.g. road vectors, POIs etc.) are defined in a co-ordinate system that corresponds or relates to the GPS co-ordinate system, enabling a device's position as determined through a GPS system to be located onto the relevant road shown in a map.<br>Route calculation uses complex algorithms applied to score large numbers of potential different routes. Once a route is calculated by the PDA, the PDA in effect has stored in a database a sequence of road names and actions to be done at predetermined distances along each road of the route (e.g. after 100 meters, turn left into street x).<br>The user can ask for the entire journey along the route to be simulated on a map displayed on the PDA: in the conventional manner, the position of the car on the displayed map is marked with an arrow; as the journey simulation progresses, the streets move past the car arrow, which is optimally fixed approximately $\frac{1}{3}^{rd}$ up from the bottom of the map, and centered. This requires the database sequence of road names and actions that define the route to be able to be sequentially selected (say simulating progress at a rate that allows the entire journey to be completed in 15 seconds) and for the map to display simulated progress of the car along the vectors which define the roads of the calculated route.<br>The car is hence shown actually navigating along the route calculated by the Navigator software. In this way, a user can check that the route looks acceptable; the user may for example, prefer a route that avoids a certain region and he may want to confirm that the route suggested by the program does bypass it. Or the user may simply feel more comfortable driving a route that he has had fully described and shown to him by the software before hand.<br>In a point of sale system, the simulation can continuously repeat. |
| Alternative route function: 'avoid roadblock' | A user could select an 'avoid roadblock' function that causes the system to recalculate a route on the basis that the road immediately ahead is blocked.<br>A route planning algorithm will work out an optimal route (optimal may refer to criteria such as shortest time or shortest distance, or some other factors) by exploring different routes and scoring them against the required criteria. In this way, one route which best meets the defied criteria is generated. If whilst actually driving along a route, an unexpected event occurs that requires the user to detour away from the precalculated route, such as a roadblock, the user can inform the software that his immediate road ahead is blocked and require the software to recalculate a new route, taking his current position as a new starting position, but taking the first turning possible away from the old calculated route. This first turning might be ahead or behind the current car position. The system hence, in constructing the new route, explores a large number of possible routes to the destination from the current position, but excludes the road immediately ahead.<br>Selecting the 'avoid roadblock' function has to be fast and involve the absolute minimum number of screen interactions to minimise driver distraction. This can be achieved by the user being able to switch from normal navigation mode (in which the current position of the car is shown on a map) to a menu mode by pressing a key or selecting any point on the screen; the menu mode displays a small number of large icons, one of which is the 'avoid roadblock' option. This can be selected with one touch; when this occurs, the software recalculates the route and gives instructions in the normal manner (voice; on screen navigation prompts) to allow the user to proceed to his destination but avoid the road immediately ahead. |

-continued

| FEATURE | COMMENT |
|---|---|
| Alternative route function: 'avoid specific road' | Allows a user to easily and rapidly select a road to mark as blocked so that he can input information from real time traffic information broadcast on the radio.<br>When listening to the radio, a user may hear that a specific road or perhaps part of a motorway between defined junctions is blocked or heavily congested. If that road is on the user's calculated route, even though it might be many kilometres away, then he will want to have the software recalculate a new route as soon as possible. The system does this by calculating a route to the final destination using the current position as a start position and exploring different routes to the destination, but excluding the road indicated as to be avoided. The new route will then be calculated using normal route planning algorithms and the user diverted onto the new route.<br>Selecting the 'avoid specific road' function has also to be fast and involve the absolute minimum number of screen interactions to minimise driver distraction. This can be achieved by the user being able to switch from normal navigation mode (in which the current position of the car is shown on a map) to a menu mode by pressing a key or selecting any point on the screen; the menu mode displays a small number of large icons, several of which are named roads on the route which, if selected, can be selected with one touch; when this occurs, the software recalculates the route and gives instructions in the normal manner (voice; on screen navigation prompts) to allow the user to proceed to his destination but avoid the road immediately ahead.<br>Typically, one touch on the screen is needed to open a window showing a list of future main roads (three currently are shown in Navigator 2.0); one further touch to select a listed icon as blocked. The system then recalculates an alternative route. |
| Alternative route function: 'penalties' | The system can also enable a user to mark certain points/regions as blocked or slow or to give penalties (or their inverse, awards) to a point/region to weight routing away from (or to) that point/region and have the system auto calculate an alternative route.<br>Also, a user could penalise specific complex junctions on a simulated route (see above) if they disliked them, or else could indicate that he wanted fewer turnings and the device would then count the number of turnings in alternative routes and give preference to the routes with fewer turnings.<br>Route planning algorithms operate by assigning scores to different possible routes in relation to different criteria (e.g. scores for the time of journey, scores for the length of journey etc) and then determining which route has the best overall score. Normally, the user cannot interact directly with how the algorithm treats roads, junctions and other route features. But in Navigator 2 it is possible: the user can directly alter the way the route planning algorithm scores a route by awarding penalties/awards to points/regions that affect the route planning scoring. The route planning algorithm stores a list of all roads/junctions in vector form associated with each calculated route from start to destination; each item (e.g. road section, turning etc.) will typically have several parameters associated with it that are used in the scoring process to evaluate a best route. Hence, it is straightforward to alter the route scoring based on giving different weightings to different kinds of items. For example, one user might dislike junctions; in which case, the route scoring could count junction numbers in alternate routes and then weight more favourably routes with fewer junctions. Similarly, roads within certain user defined regions could have some of their scoring parameters altered to change the likelihood of a route being selected using them (either to increase or decrease the likelihood of selection). |
| Alternative route function: auto generate | A user can also simply select 'alternative route' if he simply wants to see another possible route: the system then recalculates a route, not using at least 80% of the roads from the prior route. |
| Alternative route planning: selecting calculation modes | A user can select 'normal', 'strict' and 'fast' planning modes: each results in different route planning algorithms being used that calculate the route either normally, or strictly (which may take many minutes as a great many permutations are explored) or quickly, (which may take a few seconds only as many simplifying assumptions are made about the optimal route). |
| Large soft keyboard | The device can display a large keyboard, far larger than conventional screen based keyboards on PDAs. This allows a user to input text more easily—and without taking the device out of the cradle or off the dashboard—and even using his finger rather than the stylus.<br>The optimal dimensions on a iPaq are:<br>QWERTY/AZERTY keyboard images:<br>Horizontal spacing: 25 pixels center to center (button to button)<br>Vertical spacing: 32 pixels center to center (button to button)<br>ABC keyboard image: |

-continued

| FEATURE | COMMENT |
|---|---|
| | Horizontal spacing: 40 pixels center to center<br>Vertical spacing: 32 pixels center to center<br>NOTE: Numeric keyboard image is mixed (has both small and big keys) NOTE: Some keys might be 1 pixel smaller in width than other keys (aesthetics) therefore the center to center might be different from key to key.<br>The individual key size in pixels is (width, height):<br>36 × 28 (ABC keyboard image)<br>21 × 28 (QWERTY/ASERTY keyboard image)<br>46 × 28 (arrow keys on QWERTY/AZERTY keyboard images)<br>70 × 28 (space/back keys on QWERTY/AZERTY keyboard images)<br>NOTE: Some keys might be 1 pixel smaller in width than other keys (aesthetics)<br>The total image sizes for different keyboards (width, height) are as follows:<br>240 × 155 (ABC keyboard image- as seen in Navigate to Address for example)<br>240 × 155 (QWERTY keyboard image—as seen in Navigate to Address for example)<br>240 × 155 (AZERTY keyboard image—as seen in Navigate to Address for example)<br>240 × 62 (2 line NUM/Arrowkeys image—as seen in Navigate to Address, 3rd page: "Enter house number or crossing")<br>240 × 31 (1 line Arrow key image—as seen in 'navigate to recent' for example)<br>NOTE: This includes white-space edges in the range of 1 to 3 pixels. The above sizes enable a soft keyboard to be displayed that a user can readily operate with one finger when the device is mounted on a dashboard cradle with the car moving and without being significantly distracted from driving.<br>Tolerances to the above sizes are approximately 25% (plus or minus). |
| Waypoints | If you pass a location of interest on your route (e.g. while driving), you can store your present location by a very simple action (e.g. a tap on the screen or by issuing a voice command). This stores a marker in a database of waypoints; in essence the co-ordinates of the location of interest. The waypoint can be marked on the map itself with a POI icon. Later, the user can retrieve and use it (or even annotate and store it). For example, if marked as a POI on a map, the user could select the POI on the map, which would cause an annotation window to open, into which the user could input text (e.g. "great bookshop here"). |
| House numbers | Each of the following features, on its own or in combination (Navigator 2.0 uses them in combination):<br>(1) Show no house numbers on the screen except on request, when the user taps the screen. Then the relevant information pops up, and disappears again after a few seconds<br>(2) Show the house number range for the piece of street between two corners that the user clicked on<br>(3) show the street name and house number(s) for the exact spot the user clicked on<br>(4) odd numbers are always shown in certain fixed colours (e.g. yellow-on-dark blue) and odd numbers are always shown in different fixed colours (e.g. white-on-black). If both even and odd numbers are shown (which is the usual case), odd numbers are always shown before even numbers. |
| Postal code input | User can input postal code of a city instead of typing in the actual city name, when defining a home or destination which will typically be far longer (and hence inconvenient with a small on-screen keyboard).<br>Furthermore, this input variant is perfect for devices with numeric keyboards (e.g. mobile telephones)—since all countries except the United Kingdom use all-numeric postal codes that uniquely identify cities.<br>This is useful when specifying a destination with a long name; it requires there to be database of city postal codes that can be matched against, ideally with the system guessing the entire postal code from the initial letters/numbers so that the user does not even have to enter the entire city code. |
| Geocoding | Adding WGC 84 (or other co-ord) system data automatically to an address in a contacts list by using the co-ord system knowledge of an integrated navigation program.<br>The Navigator software is programmed with the WGC84 (or other co-ord system) co-ordinates of roads and house numbers along a road. Hence, when a user defines a start or destination address as part of the normal route planning process, the software determines the associated WGC84 co-ordinates; it can then also mark the start and destination positions on the map with appropriate icons. It can |

| FEATURE | COMMENT |
|---|---|
| | share this facility with a contacts application: a software component could take a contact address from the database used by the contact application and export it to the engine in the navigation software that converts addresses to WGC84 co-ordinates. This engine could then determine the WGC84 co-ordinates and then return that WGC84 data to a new field in the database used by the contacts application—the new field stores and makes available the WGC84 data within the contacts application or other applications. |
| Contacts integration | Auto-generating an option within the Contacts application to navigate to that contact within the navigation program and/or show the location of the contact on a mapping application. |
| Hot list of most important POIs | System offers a "navigate to nearby point of interest" option. This first provides a "hot list" of POI icons for the small set of "most often used" POI types.<br>The list is initialized to generally useful POI types (for car drivers) like petrol station, restaurants, parking spots etc. Hence, a user can very readily ask the program to navigate him to the nearest petrol station etc.<br>The system in effect recalculates a route with the closest relevant POI as the destination and the current location as the start.<br>The user can manually adjust the types to suit his own needs.<br>Furthermore, at least one of the icons will self-adjust to the most recently used type not already in the list. |
| POI along the route | Searching for POIs would normally be done by defining a point and searching outwards from that point to locate relevant POIs. Applying this approach to finding POIs along a route would be impossible on a PDA because you would in effect be replicating the search for all points along the route (potentially millions of separate searches for a long journey, which would be too great a load). We reverse this approach by taking each relevant POI and seeing if it is on a vectoir/line that that also defines part of the route—a simple and fast correlation process between POIs and route lines, that can rapidly be repeated for all POIs of relevance. |

The invention claimed is:

1. A navigation device, comprising:
a storage device to store map information;
a processor to determine a route of travel based upon a current position of the navigation device and an input or selected destination position; and
a display to display a first level of detail of the map information corresponding to the determined route of travel while a vehicle, in which the navigation device is located, is determined by the processor to be travelling at a speed at least equal to a threshold speed, and to display a second level of detail of the map information upon the processor determining that the speed of the vehicle, in which the navigation device is located, is below the threshold speed, the second level including relatively more detail than the first level of detail.

2. The navigation device of claim 1, wherein a level of detail of the map information displayed relatively increases as the speed of the vehicle in which the navigation device is located relatively decreases.

3. The navigation device of claim 1, wherein a level of detail of the map information displayed progressively increases as threshold speeds are reached.

4. The navigation device of claim 1, wherein the display returns to a normal level of detail of the map information, upon the speed of the vehicle reaching the threshold.

5. A method, comprising:
storing map information in a storage device of a navigation device;
determining a route of travel based upon a current position of the navigation device and an input or selected destination position;
and
displaying a first level of detail of the map information, on a display of the navigation device, of the map information corresponding to the determined route of travel while a vehicle, in which the navigation device is located, is determined by the processor to be travelling at a speed at least equal to a threshold speed, and the displaying including a second level of detail of the map information upon the processor determining that the speed of the vehicle, in which the navigation device is located, is below the threshold speed, the second level of detail including relatively more detail than the first level of detail.

6. The method of claim 5, wherein a level of detail of the map information displayed relatively increases as the speed of the vehicle in which the navigation device is located relatively decreases.

7. The method of claim 5, wherein a level of detail of the map information displayed progressively increases as threshold speeds are reached.

8. The method of claim 5, wherein the display returns to a normal level of detail of the map information, upon the speed of the vehicle reaching the threshold.

* * * * *